United States Patent
Cha et al.

(10) Patent No.: US 12,021,599 B2
(45) Date of Patent: Jun. 25, 2024

(54) METHOD FOR TRANSMITTING/RECEIVING SIGNAL IN WIRELESS COMMUNICATION SYSTEM AND APPARATUS SUPPORTING SAME

(71) Applicant: LG ELECTRONICS INC., Seoul (KR)

(72) Inventors: Hyunsu Cha, Seoul (KR); Jeongsu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 17/799,493

(22) PCT Filed: Feb. 15, 2021

(86) PCT No.: PCT/KR2021/001886
§ 371 (c)(1),
(2) Date: Aug. 12, 2022

(87) PCT Pub. No.: WO2021/162512
PCT Pub. Date: Aug. 19, 2021

(65) Prior Publication Data
US 2023/0344504 A1    Oct. 26, 2023

(30) Foreign Application Priority Data

Feb. 13, 2020   (KR) ................. 10-2020-0017921

(51) Int. Cl.
*H04K 1/10*      (2006.01)
*H04B 7/08*      (2006.01)
*H04L 5/00*      (2006.01)
*H04L 27/28*     (2006.01)

(52) U.S. Cl.
CPC ........... *H04B 7/088* (2013.01); *H04L 5/0048* (2013.01)

(58) Field of Classification Search
CPC ....... H04B 7/088; H04L 5/0048; H04W 24/10
USPC ........................ 375/260, 346, 267, 299, 347
See application file for complete search history.

(56) References Cited

U.S. PATENT DOCUMENTS

2017/0289948 A1   10/2017  Lee et al.
2019/0037529 A1    1/2019  Edge et al.
2021/0051622 A1*   2/2021  Manolakos ........... H04W 24/10

OTHER PUBLICATIONS

LG Electronics, "Discussion on necessity and details for physical-layer procedures to support UE-gNB measurements", 3GPP TSG RAN WG1 #99, Nov. 18-22, 2019, R1-1912275.
Huawei, HiSilicon, "Considerations on DL procedures for NR positioning", 3GPP TSG-RAN WG2 Meeting #108, Nov. 18-22, 2019, R2-1914980.
Intel Corporation, ESA, "Running CR for the introduction of NR positioning", Change Request, 3GPP TSG-RAN WG2 Meeting #108, Nov. 18-22, 2019, R2-1916472.

* cited by examiner

*Primary Examiner* — Phuong Phu
(74) *Attorney, Agent, or Firm* — BRYAN CAVE LEIGHTON

(57) ABSTRACT

Various embodiments relate to a next-generation wireless communication system for supporting a higher data transfer rate and the like beyond the 4th generation (4G) wireless communication system. According to various embodiments, a method for transmitting/receiving a signal in a wireless communication system and an apparatus supporting same may be provided, and various other embodiments may also be provided.

10 Claims, 26 Drawing Sheets

FIG. 12
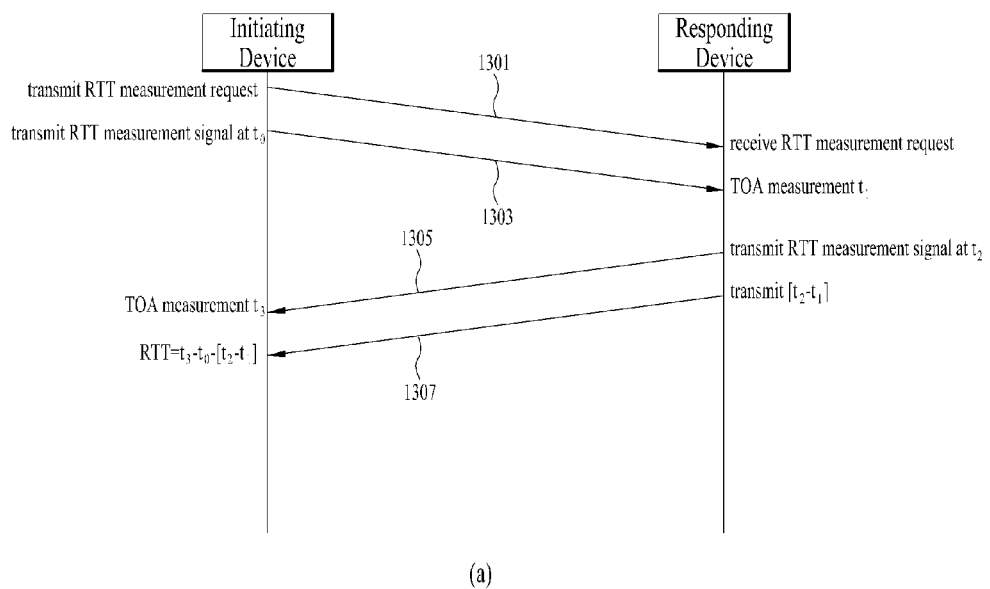
(a)
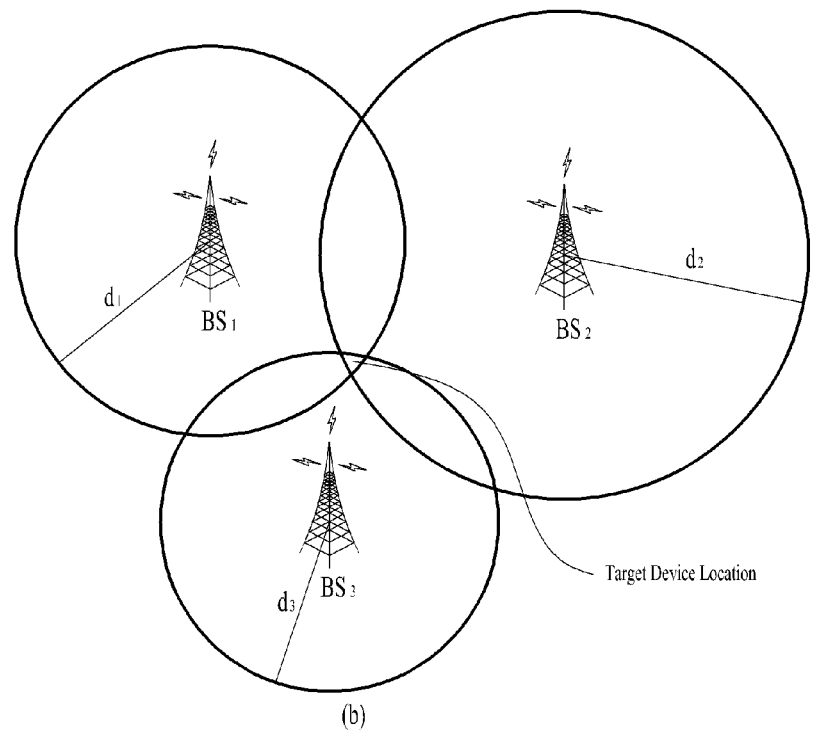
(b)

$RSTD_{23} = (\tau_2 + \tau_{RX_1}) - (\tau_3 - \tau_{RX_2}) = \tau_2 - \tau_3$
$RSTD_{13} = (\tau_1 + \tau_{RX_1}) - (\tau_3 - \tau_{RX_2}) = \tau_1 - \tau_3 + \tau_{RX_1} + \tau_{RX_2}$

METHOD FOR TRANSMITTING/RECEIVING SIGNAL IN WIRELESS COMMUNICATION SYSTEM AND APPARATUS SUPPORTING SAME

This application is the National Stage filing under 35 U.S.C. 371 of International Application No. PCT/KR2021/001886 filed on Feb. 15, 2021, which claims priority to Korean Patent Application No. 10-2020-0017921 filed on Feb. 13, 2020, the contents of which are all hereby incorporated by reference herein in their entirety.

TECHNICAL FIELD

Various embodiments are related to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a method of configuring a reference used to obtain a measurement for user equipment (UE) positioning in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method carried out by an apparatus in a wireless communication system may be provided.

According to various embodiments, the method may include: receiving configuration information related to a reference configuration for measurement related to positioning; determining a reference for the measurement; obtaining information related to one or more measurements based on the reference; and reporting the information related to the one or more measurements.

According to various embodiments, the configuration information may include information related to a reference antenna group among one or more antenna groups configured for the apparatus.

According to various embodiments, the configuration information may further include at least one of: information related to a reference transmission point (TP); information related to a reference positioning reference signal (PRS) resource; information related to a reference PRS resource set; information related to a reference synchronization signal/physical broadcast channel (SS/PBCH) block; information related to a reference channel state information reference signal (CSI-RS) resource; or information related to a reference CSI-RS resource set.

According to various embodiments, the method may further include, based on determining the reference with an antenna group different from the reference antenna group among the one or more antenna groups configured for the apparatus, reporting information related to the different antenna group.

According to various embodiments, the different antenna group may be selected based on measurement qualities of one or more PRSs respectively related to the one or more antenna groups.

According to various embodiments, based on determining the reference with the reference antenna group among the one or more antenna groups configured for the apparatus, the information related to the reference antenna group may not be reported.

According to various embodiments, different identifiers (IDs) may be respectively mapped to the one or more antenna groups.

According to various embodiments, based on a number of the one or more antenna groups being N, the information related to the reference antenna group may include information on an integer selected from {0, . . . , N−1} related to the different IDs respectively mapped to the one or more antenna groups.

According to various embodiments, N may be a natural number.

According to various embodiments, different uplink reference signal (UL RS) resource sets for UL RSs may be respectively mapped to the one or more antenna groups.

According to various embodiments, the information related to the reference antenna group may include information on an ID selected from among IDs of the different UL RS resource sets respectively mapped to the one or more antenna groups.

According to various embodiments, the configuration information may further include information related to a reference reception beam among one or more reception beams available to the apparatus, According to various embodiments, the reference reception beam may be related to a transmission beam for a UL RS.

According to various embodiments, the information related to the reference reception beam may include at least one of information related to a UL RS resource for the UL RS or information related to a UL RS resource set.

According to various embodiments, an apparatus for operating in a wireless communication system may be provided.

According to various embodiments, the apparatus may include a memory; and one or more processors connected to the memory.

According to various embodiments, the one or more processors may be configured to: receive configuration information related to a reference configuration for measurement related to positioning; determine a reference for the measurement; obtain information related to one or more measurements based on the reference; and report the information related to the one or more measurements.

According to various embodiments, the configuration information may include information related to a reference antenna group among one or more antenna groups configured for the apparatus.

According to various embodiments, the one or more processors may be configured to, based on determining the reference with an antenna group different from the reference antenna group among the one or more antenna groups configured for the apparatus, report information related to the different antenna group.

According to various embodiments, the apparatus may be configured to communicate with at least one of a mobile terminal, a network, or an autonomous driving vehicle other than a vehicle including the apparatus.

According to various embodiments, a method carried out by an apparatus in a wireless communication system may be provided.

According to various embodiments, the method may include: transmitting configuration information related to a reference configuration for measurement related to positioning; and receiving, from a user equipment (UE), information related to one or more measurements based on a reference for the measurement.

According to various embodiments, the configuration information may include information related to a reference antenna group among one or more antenna groups included in the UE.

According to various embodiments, an apparatus for operating in a wireless communication system may be provided.

According to various embodiments, the apparatus may include a memory; and one or more processors connected to the memory.

According to various embodiments, the one or more processors may be configured to: transmit configuration information related to a reference configuration for measurement related to positioning; and receive, from a UE, information related to one or more measurements based on a reference for the measurement.

According to various embodiments, the configuration information may include information related to a reference antenna group among one or more antenna groups included in the UE.

According to various embodiments, an apparatus for operating in a wireless communication system may be provided.

According to various embodiments, the apparatus may include one or more processors, and one or more memories storing one or more instructions to cause the one or more processors to carry out a method.

According to various embodiments, the method may include: receiving configuration information related to a reference configuration for measurement related to positioning; determining a reference for the measurement; obtaining information related to one or more measurements based on the reference; and reporting the information related to the one or more measurements.

According to various embodiments, the configuration information may include information related to a reference antenna group among one or more antenna groups configured for the apparatus.

According to various embodiments, a processor-readable medium configured to store at least one instruction that causes at least one processor to perform a method may be provided.

According to various embodiments, the method may include: receiving configuration information related to a reference configuration for measurement related to positioning; determining a reference for the measurement; obtaining information related to one or more measurements based on the reference; and reporting the information related to the one or more measurements.

According to various embodiments, the configuration information may include information related to a reference antenna group among one or more antenna groups configured for the apparatus.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

Advantageous Effects

According to various embodiments, a signal may be effectively transmitted and received in a wireless communication system.

According to various embodiments, positioning may be effectively performed in a wireless communication system.

According to various embodiments, the accuracy/reliability of a reference used to obtain a measurement for positioning may be improved.

According to various embodiments, the accuracy/reliability of positioning may be improved.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 12 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
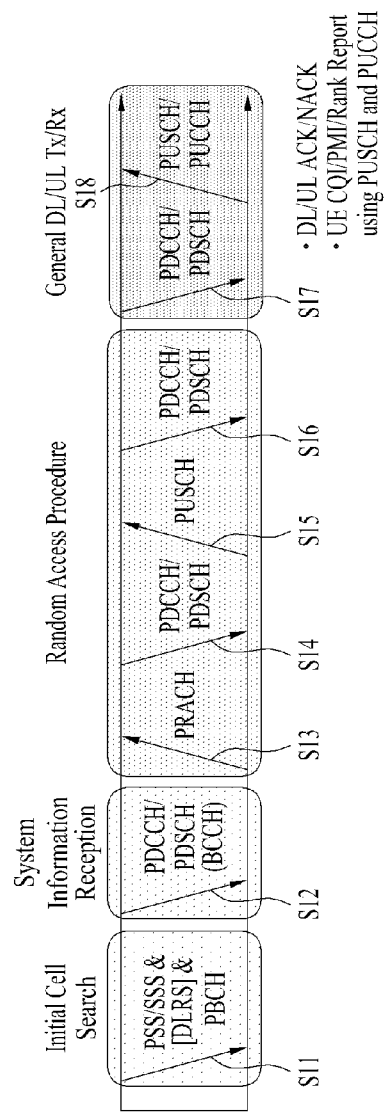
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resources

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 2:
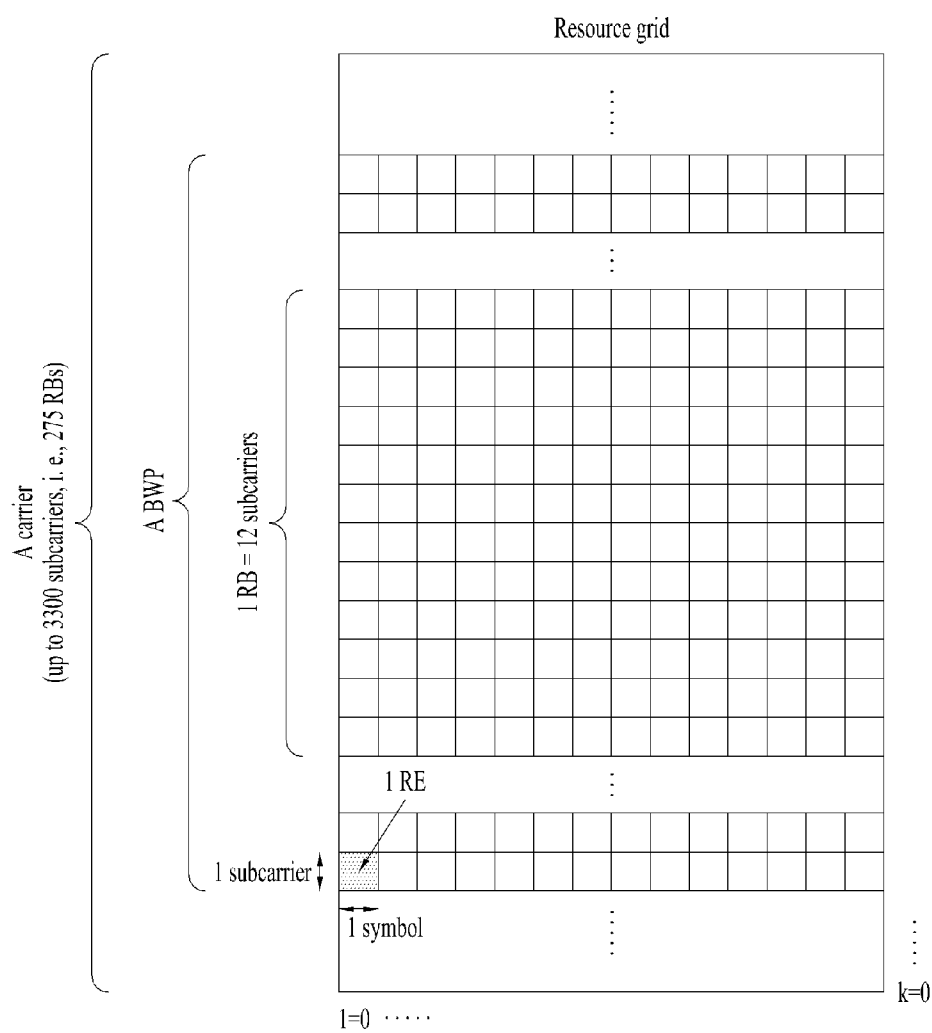
FIG. 2 is a diagram illustrating a resource grid in a new radio (NR) system to which various embodiments are applicable.

FIG. 2 illustrates an exemplary resource grid to which various embodiments are applicable.

Referring to FIG. 2, for each subcarrier spacing (SCS) and carrier, a resource grid is defined as $14 \times 2^\mu$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration p and a transmission direction, UL or DL. There is one resource grid for an SCS configuration p, an antenna port p, and a transmission direction (UL or DL). Each element of the resource grid for the SCS configuration p and the antenna port p is referred to as an RE and uniquely identified by an index pair (k, l) where k represents an index in the frequency domain, and l represents a symbol position in the frequency domain relative to a reference point. The RE (k, l) for the SCS configuration p and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 3:
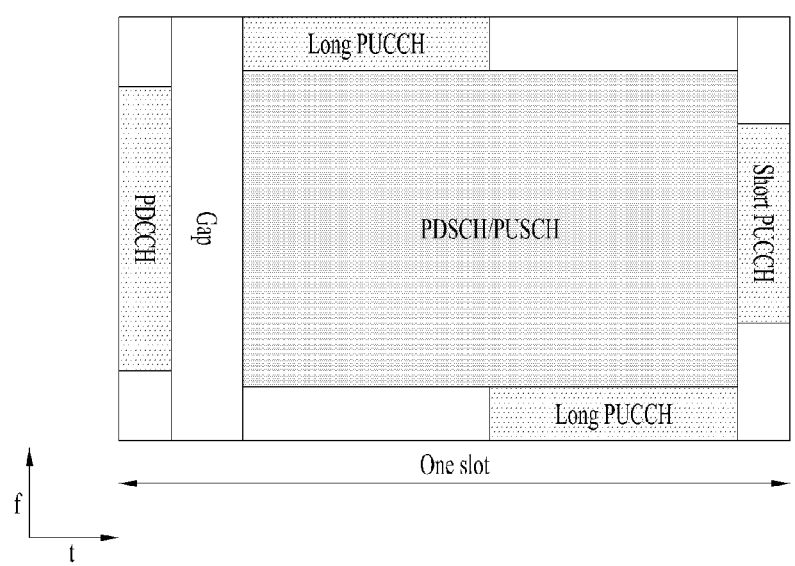
FIG. 3 is a diagram illustrating mapping of physical channels in a slot, to which various embodiments are applicable.

FIG. 3 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.3. Uplink Transmission/Reception Operation

Figure 4:
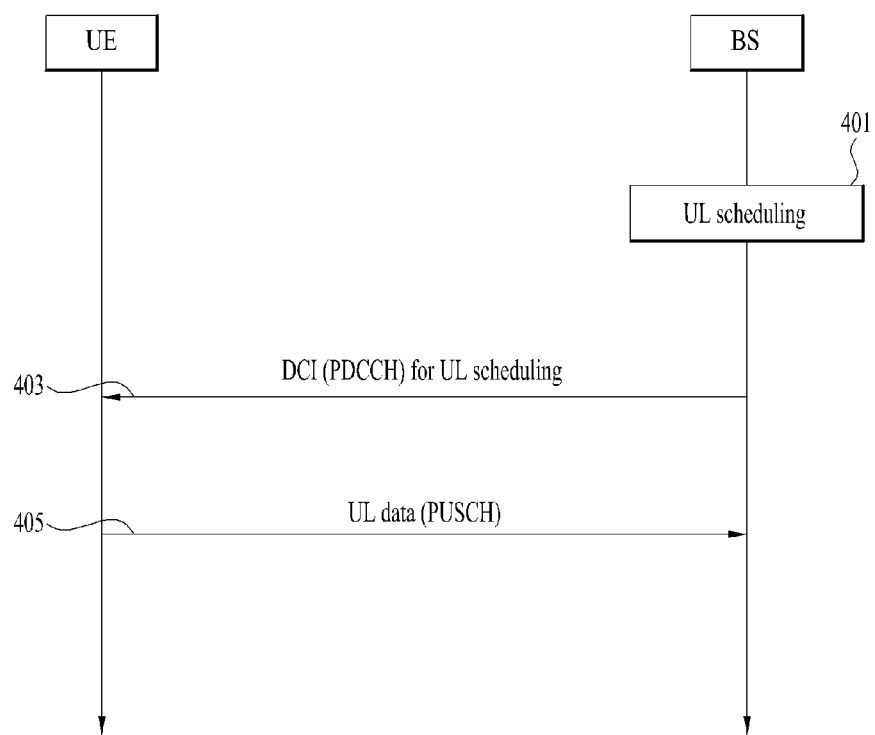
FIG. 4 is a diagram illustrating an exemplary uplink (UL) transmission/reception operation to which various embodiments are applicable.

FIG. 4 is a diagram illustrating an exemplary uplink transmission/reception operation to which various embodiments are applicable.

The BS schedules UL transmission in relation to, for example, frequency/time resources, a transport layer, a UL precoder, and an MCS (401). In particular, the BS may determine, through the above-described operations, a beam for PUSCH transmission of the UE.

The UE receives DCI for UL scheduling (including scheduling information about the PUSCH) from the BS on the PDCCH (403).

DCI format 0_0 or 0_1 may be used for UL scheduling. In particular, DCI format 0_1 includes the following information: an identifier for DCI formats, a UL/supplementary UL (SUL), a bandwidth part indicator, frequency domain resource assignment, time domain resource assignment, a frequency hopping flag, a modulation and coding scheme (MCS), an SRS resource indicator (SRI), precoding information and number of layers, antenna port(s), an SRS request, DMRS sequence initialization, and UL shared channel (UL-SCH) indicator.

In particular, SRS resources configured in an SRS resource set associated with the higher layer parameter 'usage' may be indicated by the SRS resource indicator field. In addition, 'spatialRelationInfo' may be configured for each SRS resource, and the value thereof may be one of {CRI, SSB, SRI}.

The UE transmits UL data to the BS on PUSCH (405).

When the UE detects a PDCCH including DCI format 0_0 or 0_1, it transmits the PUSCH according to an indication by the DCI.

For PUSCH transmission, two transmission schemes are supported: codebook-based transmission and non-codebook-based transmission:

i) When the higher layer parameter 'txConfig' is set to 'codebook', the UE is configured for codebook-based transmission. On the other hand, when the higher layer parameter 'txConfig' is set to 'nonCodebook', the UE is configured for non-codebook based transmission. When the higher layer parameter 'txConfig' is not configured, the UE does not expect scheduling by DCI format 0_1. When the PUSCH is scheduled according to DCI format 0_0, PUSCH transmission is based on a single antenna port.

In the case of codebook-based transmission, the PUSCH may be scheduled by DCI format 0_0 or DCI format 01, or scheduled semi-statically. When the PUSCH is scheduled by DCI format 0_1, the UE determines the PUSCH transmission precoder based on the SRI, transmit precoding matrix indicator (TPMI) and transmission rank from the DCI, as given by the SRS resource indicator field and the precoding information and number of layers field. The TPMI is used to indicate a precoder to be applied across antenna ports, and corresponds to an SRS resource selected by the SRI when multiple SRS resources are configured. Alternatively, when a single SRS resource is configured, the TPMI is used to indicate a precoder to be applied across antenna ports, and corresponds to the single SRS resource. A transmission precoder is selected from the UL codebook having the same number of antenna ports as the higher layer parameter 'nrofSRS-Ports'. When the higher layer in which the UE is set to 'codebook' is configured with the parameter 'txConfig', at least one SRS resource is configured for the UE. The SRI indicated in slot n is associated with the most recent transmission of the SRS resource identified by the SRI, where the SRS resource precedes the PDCCH carrying the SRI (i.e., slot n).

ii) In the case of non-codebook-based transmission, the PUSCH may be scheduled by DCI format 0_0 or DCI format 0_1, or scheduled semi-statically. When multiple SRS resources are configured, the UE may determine the PUSCH precoder and transmission rank based on the wideband SRI. Here, the SRI is given by the SRS resource indicator in the DCI or by the higher layer parameter 'srs-ResourceIndicator'. The UE may use one or multiple SRS resources for SRS transmission. Here, the number of SRS resources may be configured for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based UL transmission is 4. The SRI indicated in slot n is associated with the most recent transmission of the SRS resource identified by the SRI, where the SRS transmission precedes the PDCCH carrying the SRI (i.e., slot n).

1.4. Beam Management (BM)

BM is a series of processes for acquiring and maintaining a set of BS (or transmission and reception point (TRP)) beams and/or UE beams available for DL and UL transmissions/receptions. BM may include the following processes and terminology.

Beam measurement: The BS or the UE measures the characteristics of a received beamformed signal.

Beam determination: The BS or the UE selects its Tx beam/reception (Rx) beam.

Beam sweeping: A spatial domain is covered by using Tx beams and/or Rx beams in a predetermined manner during a predetermined time interval.

Beam report: The UE reports information about a beamformed signal based on a beam measurement.

The BM process may be divided into (1) a DL BM process using an SSB or a CSI-RS and (2) a UL BM process using a sounding reference signal (SRS). Further, each BM process may include Tx beam sweeping for determining a Tx beam and Rx beam sweeping for determining an Rx beam.

DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 1 describes an example of a TCI-State IE. The TC-State IE is related to a QCL type corresponding to one or two DL RSs.

TABLE 1

TCI-State
The IE TOI-State associates one or two DL reference signals
with a corresponding quasi-colocation (QCL) type.
TCI-State information element

```
-- ASN1START
-- TAG-TCI-STATE-START
TCI-State ::=                        SEQUENCE {
   tci-StateId                          TCI-StateId,
   qcl-Type1                            QCL-Info,
   qcl-Type2                            QCL-Info
                       OPTIONAL,     -- Need R
   ...
}
QCL-Info ::=                         SEQUENCE {
   cell                                 ServCellIndex
                       OPTIONAL,     -- Need R
   bwp-Id                               BWP-Id
                       OPTIONAL,     -- Cond CSI-RS-Indicated
   referenceSignal                      CHOICE {
      csi-rs                               NZP-CSI-RS-ResourceId,
      ssb                                  SSB-Index
   },
   qcl-Type                          ENUMERATED {typeA, typeB, typeC, typeD},
}
-- TAG-TCI-STATE-STOP
-- ASN1STOP
```

In Table 1, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

UL BM Process

In UL BM, reciprocity (or beam correspondence) between a Tx beam and an Rx beam may or may not be established depending on UE implementation. When the Tx beam-Rx beam reciprocity is established for both a BS and a UE, a UL beam pair may be obtained based on a DL beam pair. However, when the Tx beam-Rx beam reciprocity is not established in at least one of the BS or the UE, a process of determining a UL beam pair is necessary separately from DL beam pair determination.

Even when both the BS and the UE maintain the beam correspondence, the BS may use the UL BM process for determining a DL Tx beam, even though the UE does not request a report of a (preferred) beam UM BM may be performed by beamformed UL SRS transmission, and whether to apply UL BM to an SRS resource set is configured by (an RRC parameter) usage. When usage is set to 'BeamManagement (BM)', only one SRS resource in each of a plurality of SRS resource sets may be transmitted in a given time instant.

The UE may be configured with one or more sounding reference signal (SRS) resource sets configured by (an RRC layer parameter) SRS-ResourceSet (by RRC signaling). For each SRS resource set, the UE may be configured with K≥1 SRS resources, where K is a natural number and a maximum value of K is indicated by SRS_capability.

The UL BM process may be divided into a UE's Tx beam sweeping and a BS's Rx beam sweeping.

Figure 5:
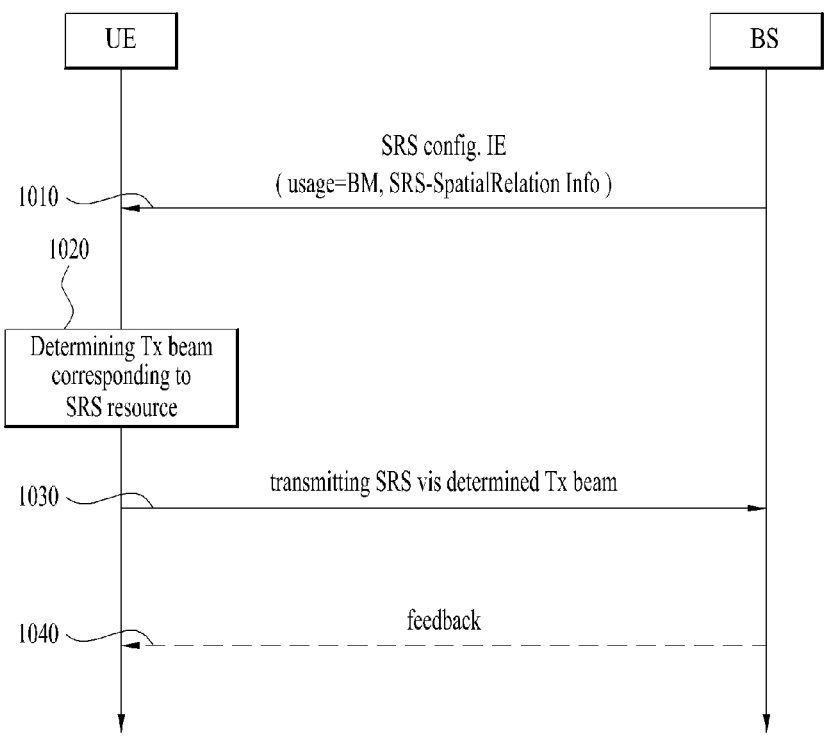
FIG. 5 is a diagram illustrating a signal flow for an exemplary UL BM process using an SRS, which is applicable to various embodiments.

FIG. 5 is a diagram illustrating a signal flow for an exemplary UL BM process using an SRS, which is applicable to various embodiments.

A UE receives, from a BS, RRC signaling (e.g., SRS-Config IE) including (an RRC parameter) usage set to 'beam management' (1010). The SRS-Config IE is used for an SRS transmission configuration. The SRS-Config IE includes an SRS-Resources list and a SRS-ResourceSet list. Each SRS resource set refers to a set of SRS-resources.

The UE determines Tx beamforming for SRS resources to be transmitted based on SRS-SpatialRelation Info included in the SRS-Config IE (1020). SRS-SpatialRelation Info is configured for each SRS resource and indicates whether to apply the same beamforming as used for an SSB, a CSI-RS, or an SRS on an SRS resource basis.

If SRS-SpatialRelationInfo is configured for an SRS resource, the same beamforming as used for the SSB, the CSI-RS, or the SRS is applied for transmission. However, if SRS-SpatialRelationInfo is not configured for the SRS resource, the UE randomly determines Tx beamforming and transmits the SRS by the determined Tx beamforming (1030).

More specifically, for a P-SRS with 'SRS-ResourceConfigType' set to 'periodic':

i) if SRS-SpatialRelationInfo is set to 'SSB/PBCH,' the UE transmits the corresponding SRS by applying the same spatial domain transmission filter as the spatial domain Rx filter used for reception of the SSB/PBCH (or a spatial domain transmission filter generated from the corresponding filter); or ii) if SRS-SpatialRelationInfo is set to 'CSI-RS,' the UE transmits the SRS by applying the same spatial domain transmission filter used for reception of the CSI-RS; or iii) if SRS-SpatialRelationInfo is set to 'SRS,' the UE transmits the SRS by applying the same spatial domain transmission filter used for transmission of the SRS.

Additionally, the UE may receive or may not receive a feedback for the SRS from the BS, as in the following three cases (1040).

i) If Spatial_Relation_Info is configured for all SRS resources within an SRS resource set, the UE transmits the SRS with a beam indicated by the BS. For example, if the Spatial_Relation_Info indicates all the same SSB, CRI, or SRI, the UE repeatedly transmits the SRS with the same beam.

ii) Spatial_Relation_Info may be configured for none of the SRS resources within the SRS resource set. In this case, the UE may perform transmission while freely changing SRS beamforming.

iii) Spatial_Relation_Info may be configured for only some SRS resources within the SRS resource set. In this case, the UE may transmit the SRS in the configured SRS resources with the indicated beam, and transmit the SRS in SRS resources for which Spatial_Relation_Info is not configured, by randomly applying Tx beamforming.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 6:
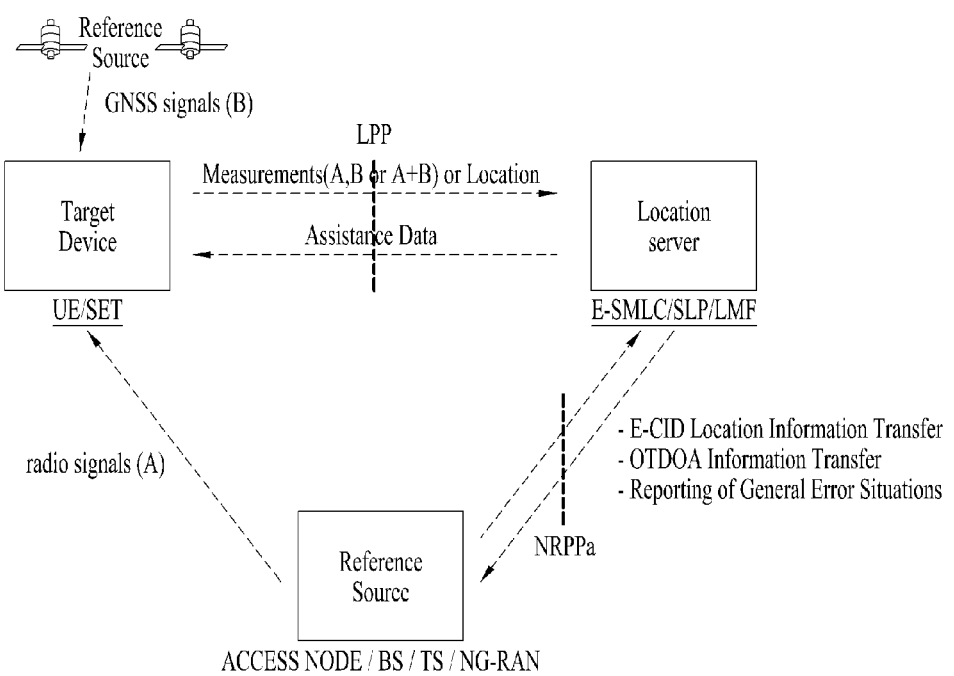
FIG. 6 is a diagram illustrating a positioning protocol configuration for positioning a user equipment (UE), to which various embodiments are applicable.

FIG. 6 is a diagram illustrating an exemplary positioning protocol configuration for positioning a UE, to which various embodiments are applicable.

Referring to FIG. 6, an LTE positioning protocol (LPP) may be used as a point-to-point protocol between a location server (E-SMLC and/or SLP and/or LMF) and a target device (UE and/or SET), for positioning the target device using position-related measurements acquired from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1))$$ [Equation 1]

c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1)(2(n_{ID,seq}^{PRS}\bmod 1024) + 1) + \left(n_{ID,seq}^{PRS}\bmod\right)\right)\bmod 2^{31}$$ [Equation 2]

$n_{s,f}^{\mu}$ may be a slot number in a frame in an SCS configuration μ. A DL PRS sequence ID $n_{ID,seq}^{PRS} \in \{0, 1, \ldots 4095\}$ may be given by a higher-layer parameter (e.g., DL-PRS-SequenceId). l may be an OFDM symbol in a slot to which the sequence is mapped.

Mapping to Physical Resources in a DL PRS Resource

A PRS sequence r(m) may be scaled by $\beta_{PRS}$ and mapped to REs $(k,l)_{p,\mu}$, specifically by Equation 7. $(k,l)_{p,\mu}$ may represent an RE (k, l) for an antenna port p and the SCS configuration μ.

$$a_{k,l}^{(p,\mu)} = \beta_{PRS}r(m)$$

$$m=0,1,\ldots$$

$$k=mK_{comb}^{PRS}+((k_{offset}^{PRS}+k')\bmod K_{comb}^{PRS})$$

$$l=l_{start}^{PRS}, l_{start}^{PRS}+1, \ldots, l_{start}^{PRS}+1, \ldots, l_{start}^{PRS}+L_{PRS}-1$$ [Equation 3]

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition:

$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2,4,6,16\}$ may be given by a higher-layer parameter DL-PRS-NumSymbols. A comb size $K_{comb}^{PRS} \in \{2,4,6,12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}$, $\{4, 2\}$, $\{6, 2\}$, $\{12, 2\}$, $\{4, 4\}$, $\{12, 4\}$, $\{6, 6\}$, $\{12, 6\}$ and/or $\{12, 12\}$. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 2.

TABLE 2

| $K_{comb}^{PRS}$ | Symbol number within the downlink PRS resource $l - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$(N_{slot}^{frame,\mu} n_f + n_{s,f}^{\mu} - T_{offset}^{PRS} - T_{offset,res}^{PRS}) \mod 2\mu T_{per}^{PRS} \in \{iT_{gap}^{PRS}\}_{i=0}^{T_{rep}^{PRS}-1} \quad \text{[Equation 4]}$$

$N_{slot}^{frame,\mu}$ may be the number of slots per frame in the SCS configuration μ. $n_f$ may be a system frame number (SFN). $n_{s,f}^{\mu}$ may be a slot number in a frame in the SCS configuration μ. A slot offset $T_{offset}^{PRS} \in \{(0,1,\ldots,T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4,5,8,10,16,20,32,40,64,80,160,320,640,1280,2560,5120,10240\}$ may be given by a higher-layer parameter DL-PRS-Periodicity. A repetition factor $T_{rep}^{PRS} \in \{1,2,4,6,8,16,32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRS} \in \{1,2,4,8,16,32\}$ may be given by a higher-layer parameter DL-PRS-ResourceTimeGap.

2.3. UE Positioning Architecture in NR System

Figure 7:
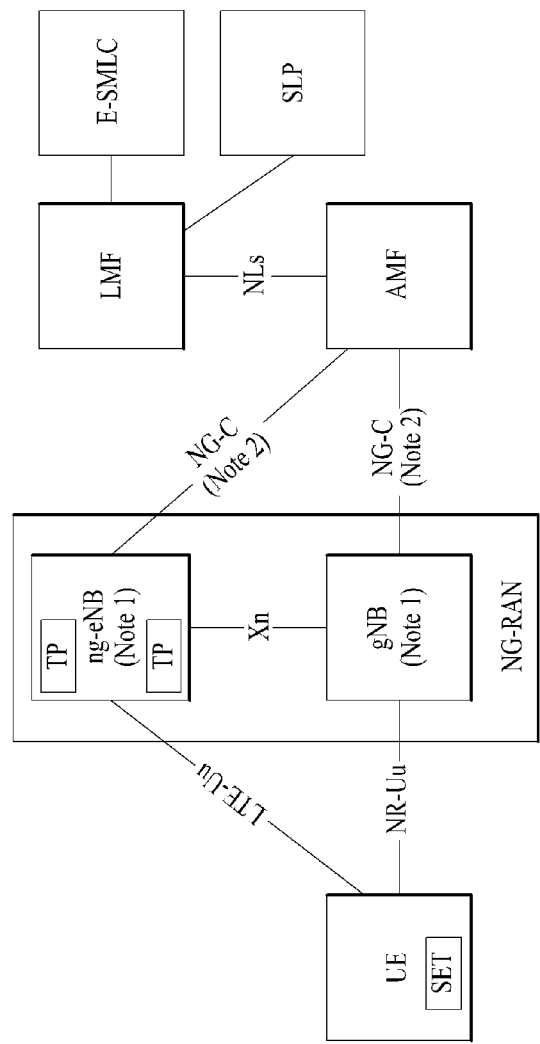
FIG. 7 illustrates architecture of a 5G system applicable to positioning of a UE connected to an NG-RAN or an E-UTRAN.

FIG. 7 illustrates architecture of a 5G system applicable to positioning of a UE connected to an NG-RAN or an E-UTRAN.

Referring to FIG. 7, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 8:
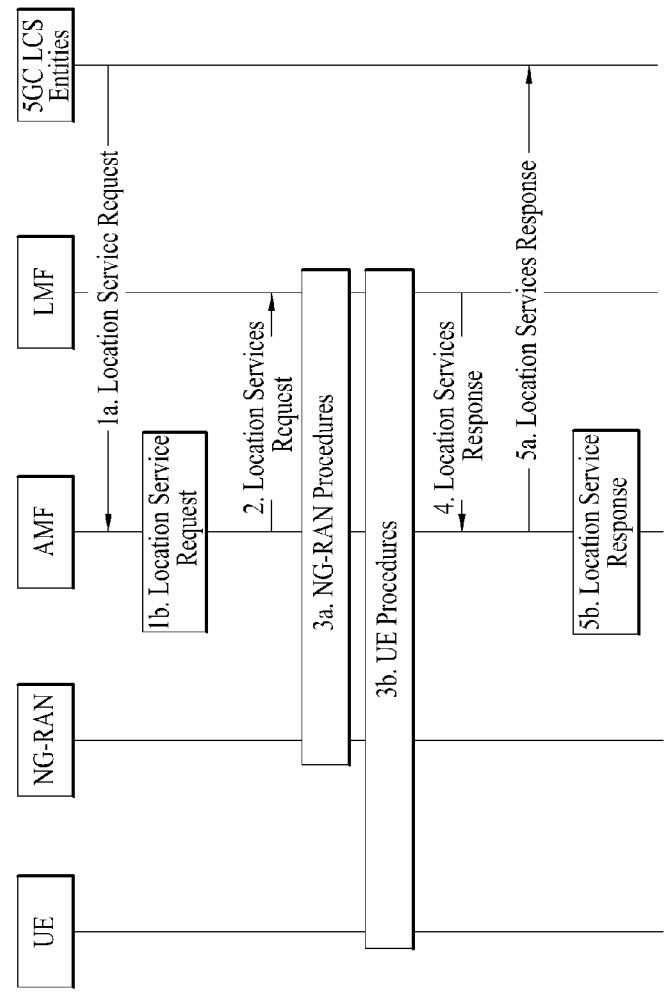
FIG. 8 illustrates an implementation example of a network for UE positioning.

FIG. 8 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3*b*, when information or requests exchanged between the LMF and the UE are erroneous, an error message may be transmitted and received and an abort message for aborting positioning may be transmitted and received.

Protocol used in step 3*b* may be an LPP protocol which will be described later.

Step 3*b* may be performed additionally after step 3*a* but may be performed instead of step 3*a*.

In step 4, the LMF may provide a location service response to the AMF. The location service response may include information as to whether UE positioning is successful and include a location estimate value of the UE. If the procedure of FIG. 13 has been initiated by step 1*a*, the AMF may transfer the location service response to a 5GC entity such as a GMLC. If the procedure of FIG. 13 has been initiated by step 1*b*, the AMF may use the location service response in order to provide a location service related to an emergency call.

2.5. Positioning Protocol

LTE Positioning Protocol (LPP)

Figure 9:
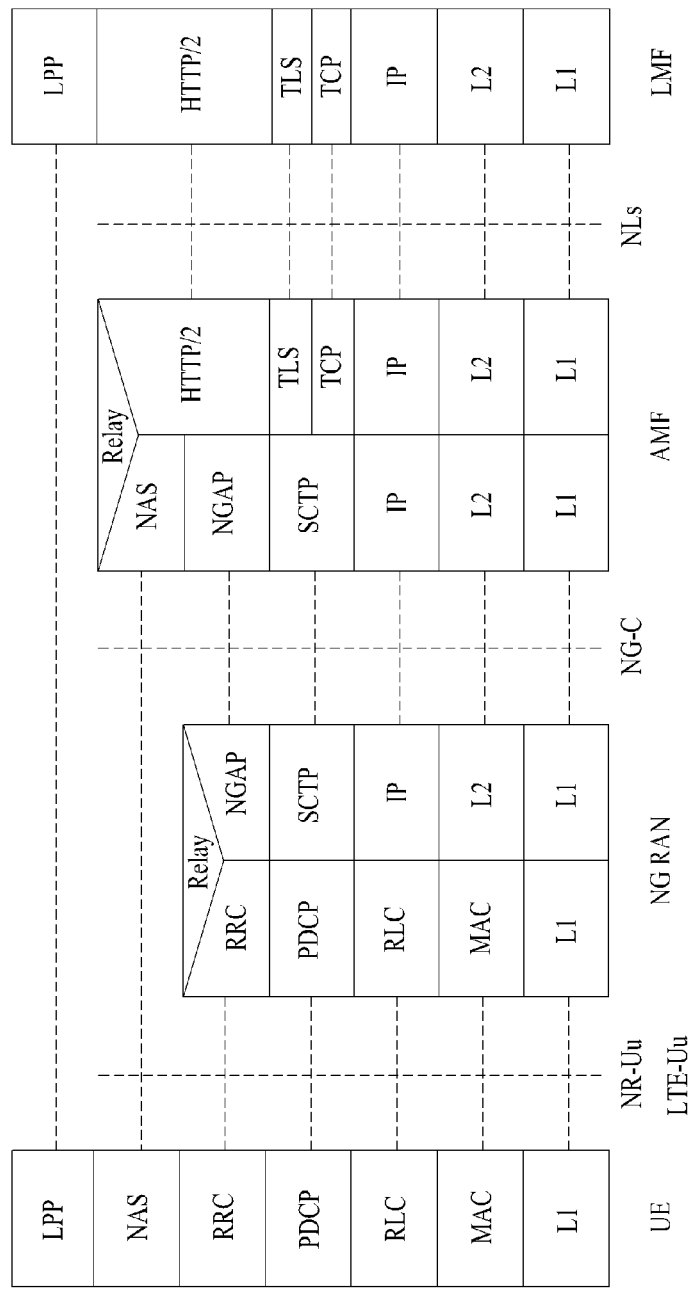
FIG. 9 is a diagram illustrating protocol layers for supporting LTE positioning protocol (LPP) message transmission, to which various embodiments are applicable.

FIG. 9 illustrates an exemplary protocol layer used to support LPP message transfer between an LMF and a UE. An LPP protocol data unit (PDU) may be carried in a NAS PDU between an AMF and the UE.

Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 10:
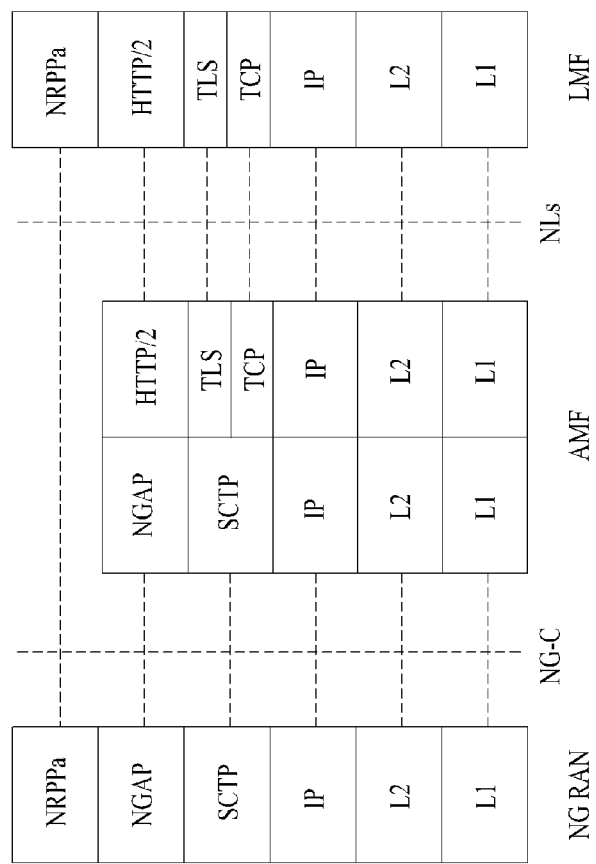
FIG. 10 is a diagram illustrating protocol layers for supporting NR positioning protocol a (NRPPa) protocol data unit (PDU) transmission, to which various embodiments are applicable.

FIG. 10 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference of Arrival)

Figure 11:
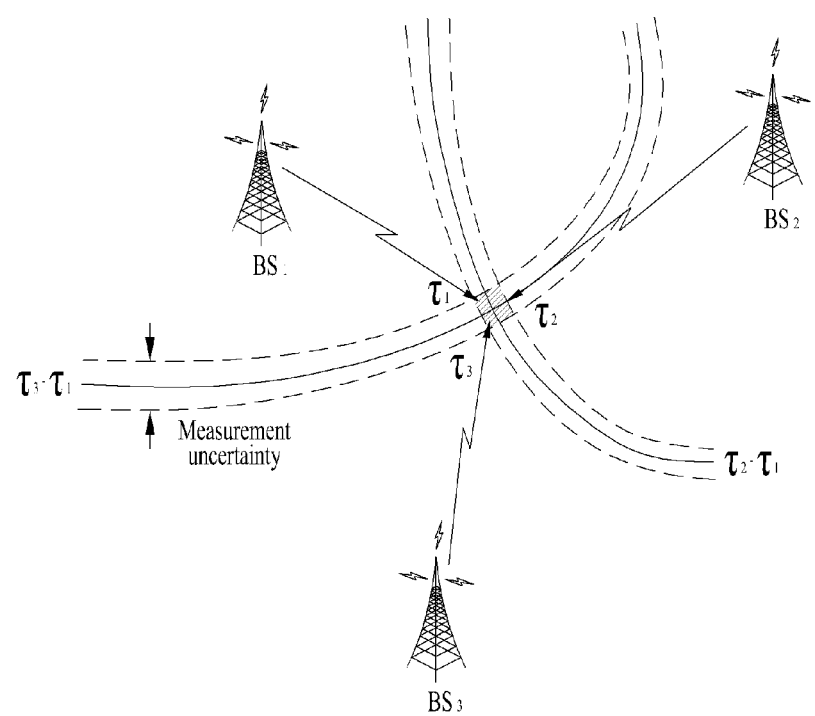
FIG. 11 is a diagram illustrating an observed time difference of arrival (OTDOA) positioning method, to which various embodiments are applicable.

FIG. 11 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 5]

In Equation 9, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

$T_{ADV}$ Type 1=(ng-eNB Rx-Tx time difference)+(UE E-UTRA Rx-Tx time difference)

$T_{AD}V$ Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

FIG. 12 is a diagram illustrating an exemplary multi-RTT positioning method to which various embodiments are applicable.

Referring to FIG. 12(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1301 according to an exemplary embodiment, the initiating device may transmit an RTT measurement request, and the responding device may receive the RTT measurement request.

In operation 1303 according to an exemplary embodiment, the initiating device may transmit an RTT measurement signal at time $t_0$, and the responding device may obtain TOA measurement $t_1$.

In operation 1305 according to an exemplary embodiment, the responding device may transmit an RTT measurement signal at time $t_2$, and the initiating device may obtain TOA measurement $t_3$.

In operation 1307 according to an exemplary embodiment, the responding device may transmit information about $[t_2-t_1]$, and the initiating device may receive the corresponding information and calculate an RTT based on Equation 6 below. The corresponding information may be transmitted and received by a separate signal or in the RTT measurement signal of operation 1705.

$$RTT = t_3 - t_0 - [t_2 - t_1] \quad \text{[Equation 6]}$$

Referring to FIG. 12(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
AOA (AoA): angle of arrival
CSI-RS: channel state information reference signal
LMF: location management function
MAC: medium access control
MAC-CE: MAC-control element
OTDOA (OTDoA): observed time difference of arrival
PRS: positioning reference signal
RS: reference signal
RTT: round trip time
RSRP: reference signal received power
RSRQ: reference signal received quality
RSTD: reference signal time difference/relative signal time difference
SINR: signal to interference plus noise ratio)
SNR: signal to noise ratio
SRS: sounding reference signal. In the description of various embodiments, the SRS may be an SRS for positioning and/or a multi-input multi-output (MIMO) SRS used channel estimation/beam management.
SS: synchronization signal
SSB: synchronization signal block
SS/PBCH: synchronization signal/physical broadcast channel
TA: timing advance/time advance
TDOA (TDoA): timing difference of arrival
TOA (ToA): time of arrival
TRP: transmission and reception point (TP: transmission point)
Tx: transmit/transmission, Rx: receive/reception In the description of various embodiments, the term BS may be understood as an umbrella term including a remote radio head (RRH), eNB, gNB, TP, reception point (RP), relay, etc.

In the description of various embodiments of the present disclosure, when it is said that something is more than/more than or equal to A, it may be interpreted to mean that the thing is more than or equal to/more than A.

In the description of various embodiments of the present disclosure, when it is said that something is less than/less than or equal to B, it may be interpreted to mean that the thing is less than or equal to/less than B.

All operations of the UE according to various embodiments may be configured/indicated by the BS/location server/LMF and/or other UEs.

In the description of various embodiments, a TRP ID/PRS resource set ID/PRS resource ID reported by the UE may be the ID of a TRP/PRS resource set/PRS resource used by the UE (to configure/determine a reference timing) unless stated otherwise. For example, a TRP ID/PRS resource set ID/PRS resource ID reported by the UE depending on the operation of the UE may be the same as and/or different from a reference TRP ID/reference PRS resource set ID/reference PRS resource ID included in reference configuration information In the description of various embodiments, Rx beam information/Tx and Rx panel information/antenna group information/antenna element information reported by the UE may be information (e.g., ID/index) on an Rx beam/a Tx and Rx panel/antenna group/antenna element used by the UE (e.g., to configure/determine a reference timing) unless specified otherwise. For example, Rx beam information/Tx and Rx panel information/antenna group information/antenna element information reported by the UE depending on the operation of the UE may be the same as and/or different from reference reception beam information/reference Tx and Rx panel information/reference antenna group information/reference antenna element information included in reference configuration information.

In the description of various embodiments, a TRP ID selected/used by the UE may be replaced with the ID of a TRP selected/used by the UE unless stated otherwise.

In the description of various embodiments, a PRS (resource) ID selected/used by the UE may be replaced with the ID of a PRS (resource) selected/used by the UE unless stated otherwise.

In the description of various embodiments, a PRS resource set ID selected/used by the UE may be replaced with the ID of a PRS resource set selected/used by the UE unless stated otherwise.

In the description of various embodiments, Rx beam information/Tx and Rx panel information/antenna group information/antenna element information selected/used by the UE may be replaced with information on an Rx beam/Tx and Rx panel/antenna group/antenna element selected/used by the UE unless specifically stated otherwise.

Various embodiments may be related to methods of configuring reference information and/or methods of reporting reference information. For example, when a UE positioning technique of estimating the location of the UE based on timing measurements is used, various embodiments may be related to methods of configuring reference information required for the UE to obtain/determine/select a reference timing measurement and/or methods for the UE to report the reference information.

The methods of configuring and/or reporting reference information according to various embodiments are not limited to UE positioning techniques based on timing measurements, and the methods may be extended and/or applied to UE positioning techniques based on other measurements.

Various embodiments may be related to reference configurations.

To obtain and report an RSTD/UE Rx-Tx time difference measurement, the UE may receive reference configuration information for obtaining the reference of timing measurements.

The configuration of the BS/location server/LMF and/or the reporting operation of the UE may vary depending on TRPs/PRS resource sets/PRS resources. For example, the configuration of the BS/location server/LMF and/or the reporting operation of the UE may vary depending on whether each configuration is mandatory or optional.

The UE may receive reference configuration information from the BS/location server/LMF (and/or a specific transmission and reception node, an integrated access and backhaul (JAB) node, specific UE, etc.) to obtain/use a timing reference (reference timing) and/or other references for a DL TDOA technique, a multi-cell RTT technique, and/or a DL-AOD based UE positioning technique.

At least one of the following information may be configured for reference configuration information.

1) Information about one or more TRPs/cells: For example, a TP ID, a TRP ID, a physical/global cell ID, etc. may be configured. In this case, a TRP may be the same as or different from a TP.

2) Information about one or more RSs (resources, resource sets, blocks, etc.): For example, a DL PRS, a DL PRS resource ID/index, a DL SS/PBCH (DL SSB), a CSI-RS, demodulation reference signal (DM-RS), a sidelink (SL) RS, etc. may be configured.

3) Information on one or more Rx beams of the UE: For example, Rx panel information (e.g., panel ID/index, ID of an Rx panel, etc.), Rx beam information (e.g., Rx beam ID/index, etc.), SRS resource and/or SRS resource set information (e.g., SRS resource ID, SRS resource set ID, etc.) may be configured.

For example, an IE (information element), NR-DL-PRS-AssistanceData may be used by the location server and/or LMF to provide DL PRS assistance data.

Table 3 shows at least parts of the IE NR-DL-PRS-AssistanceData.

TABLE 3

NR-DL-PRS-AssistanceData
The IE NR-DL-PRS-AssistanceData is used by the location server to provide DL-PRS assistance data.

-- ASN1START
NR-DL-PRS-AssistanceData-r16 ::= SEQUENCE {
    nr-DL-PRS-ReferenceInfo-r16        DL-PRS-ID-Info-r16,
    nr-DL-PRS-AssistanceDataList-r16     SEQUENCE (SIZE (1..nrMaxFreqLayers-r16)) OF
        NR-DL-PRS-AssistanceDataPerFreq-r16,
    nr-SSB-Config-r16                              SEQUENCE (SIZE (1..nrMaxTRPs-r16)) OF
        NR-SSB-Config-r16    OPTIONAL,    -- Need ON
}
NR-DL-PRS-AssistanceDataPerFreq-r16 ::= SEQUENCE {
    nr-DL-PRS-PositioningFrequencyLayer-r16
                                                    NR-DL-PRS-PositioningFrequencyLayer-r16,
    nr-DL-PRS-AssistanceDataPerFreq-r16 SEQUENCE (SIZE (1..nrMaxTRPsPerFreq-r16)) OF
        NR-DL-PRS-AssistanceDataPerTRP-r16,
    ...
}

Table 4 shows the definitions of at least parts of the IE NR-DL-PRS-AssistanceData.

TABLE 4

| NR-DL-PRS-AssistanceData field descriptions |
|---|
| nr-DL-PRS-Referenceinfo |
| This field specifies the IDs of the assistance data reference TRP. |
| nr-DL-PRS-AssistanceDataList |
| This field specifies the DL-PRS resources for each frequency layer. |
| nr-SSB-Config |
| This field specifies the SSB configuration of the TRPs. |
| nr-DL-PRS-PositioningFrequencyLayer |
| This field specifies the Positioning Frequency Layer for the nr-DL-PRS-AssistanceDataPerFreq field. |
| nr-DL-PRS-AssistanceDataPerFreq |
| This field specifies the DL-PRS Resources for the TRPs within the Positioning Frequency Layer. |

NR-DL-PRS-AssistanceData may include nr-DL-PRS-ReferenceInfo-r16 (DL-PRS-ID-Info-r16). The UE may be provided with the reference configuration for a PRS.

For example, the UE may be configured with a specific TRP/cell ID, a specific DL PRS resource set ID, and/or a specific PRS ID as the reference configuration.

For example, DL-PRS-ID-Info may be used by the location server and/or LMF to provide the ID of a DL PRS resource of a reference TRP.

Table 5 shows at least parts of the IE DL-PRS-ID-Info.

TABLE 5

DL-PRS-ID-Info
The IE DL-PRS-ID-Info provides the IDs of the reference TRPs' DL-PRS Resources.

-- ASN1START
DL-PRS-ID-Info-r16 ::= SEQUENCE {
    dl-PRS-ID-r16                          INTEGER (0..255),
    nr-DL-PRS-ResourceID-List-r16    SEQUENCE (SIZE (1..nrMaxResourceIDs-r16)) OF
    NR-DL-PRS-ResourceID-r16         OPTIONAL,
    nr-DL-PRS-ResourceSetID-r16     NR-DL-PRS-ResourceSetID-r16
                OPTIONAL
}
-- ASN1STOP Table 6 shows the definitions of at least parts of the IE DL-PRS-ID-Info.

TABLE 6

DL-PRS-ID-Info field descriptions nr-DL-PRS-ResourceID-List

This field provides a list of DL-PRS Resource IDs under the same DL-PRS Resource Set.

For example, dl-PRS-ID-r16 may correspond to a TRP ID.

For example, nr-DL-PRS-ResourceSetID-r16 may correspond to the ID of a specific DL PRS resource set among one or more DL PRS resource sets configured for the UE.

For example, nr-DL-PRS-ResourceID-r16 may correspond to the ID of a specific DL PRS resource included in a DL PRS resource set (nr-DL-PRS-ResourceSetID-r16).

For example, the UE may receive all or some of the PRS resources and/or PRS resource sets transmitted by a specific cell/BS/TRP. Then, the UE may determine a first peak (e.g., first TOA) by combining the obtained measurements and then configure/determine/obtain the first peak as the reference timing.

However, information that the UE needs to report to the BS/location server/LMF may vary depending on reference configuration information that the UE receives from the BS/location server/LMF to configure/determine/obtain the reference timing.

Additionally/alternatively, information that the UE needs to report to BS/location server/LMF may vary depending on whether reference configuration information configured by the BS/location server/LMF to allow the UE to determine the reference timing is the same or different from information used by the UE to determine the reference timing.

Figure 13:
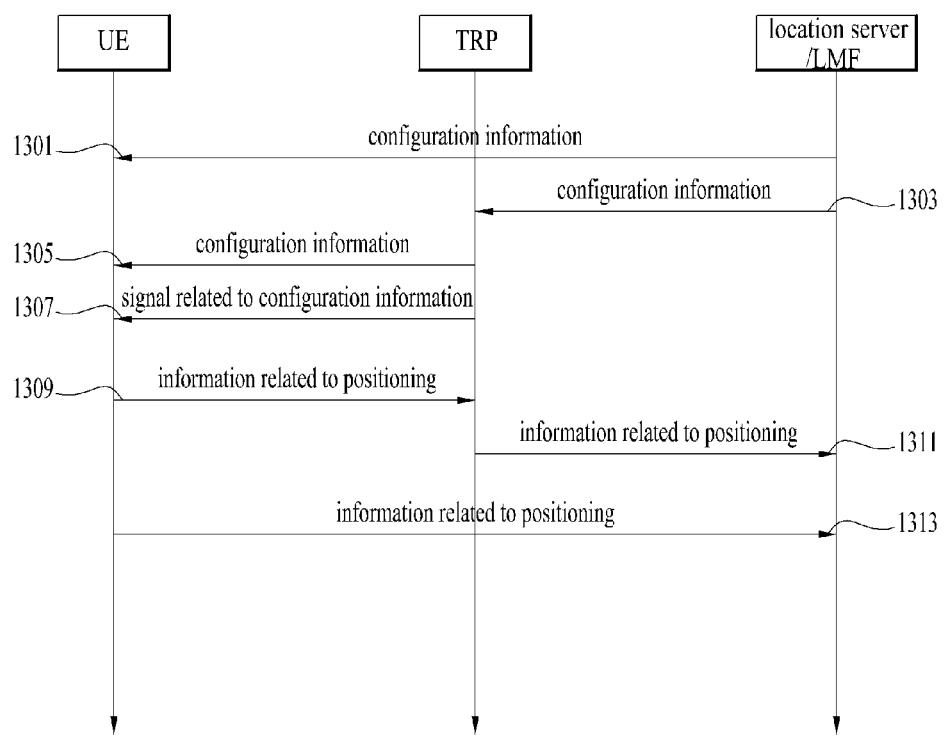
FIG. 13 is a simplified diagram illustrating a method of operating a UE, a transmission and reception point (TRP), a location server, and/or a location management function (LMF) according to various embodiments.

FIG. 13 is a simplified diagram illustrating an operating method of a UE, a TRP, a location server, and/or an LMF according to various embodiments.

Referring to FIG. 13, in operation 1301 according to various embodiments, the location server and/or the LMF may transmit configuration information to the UE and the UE may receive the configuration information.

In operation 1303 according to various embodiments, the location server and/or the LMF may transmit reference configuration information to the TRP and the TRP may receive the reference configuration information. In operation 1305 according to various embodiments, the TRP may transmit the reference configuration information to the UE and the UE may receive the reference configuration information. In this case, operation 1301 according to various embodiments may be omitted.

In contrast, operations 1303 and 1305 according to various embodiments may be omitted. In this case, operation 1301 according to various embodiments may be performed.

That is, operation 1301 according to various embodiments, and operations 1303 and 1305 according to various embodiments may be selectively performed.

In operation 1307 according to various embodiments, the TRP may transmit a signal related to the configuration information and the UE may receive the signal related to the configuration information. For example, the signal related to the configuration information may be a signal for positioning of the UE.

In operation 1309 according to various embodiments, the UE may transmit a signal related to positioning to the TRP and the TRP may receive the signal related to positioning. In operation 1311 according to various embodiments, the TRP may transmit the signal related to positioning to the location server and/or the LMF and the location server and/or the LMF may receive the signal related to positioning.

In operation 1313 according to various embodiments, the UE may transmit the signal related to positioning to the location server and/or the LMF and the location server and/or the LMF may receive the signal related to positioning. In this case, operations 1309 and 1311 according to various embodiments may be omitted.

In contrast, operation 1313 according to various embodiments may be omitted. In this case, operations 1309 and 1311 according to various embodiments may be performed.

That is, operations 1309 and 1311 according to various embodiments, and operation 1313 according to various embodiments may be selectively performed.

According to various embodiments, the signal related to positioning may be obtained based on the configuration information and/or the signal related to the configuration information.

Figure 14:
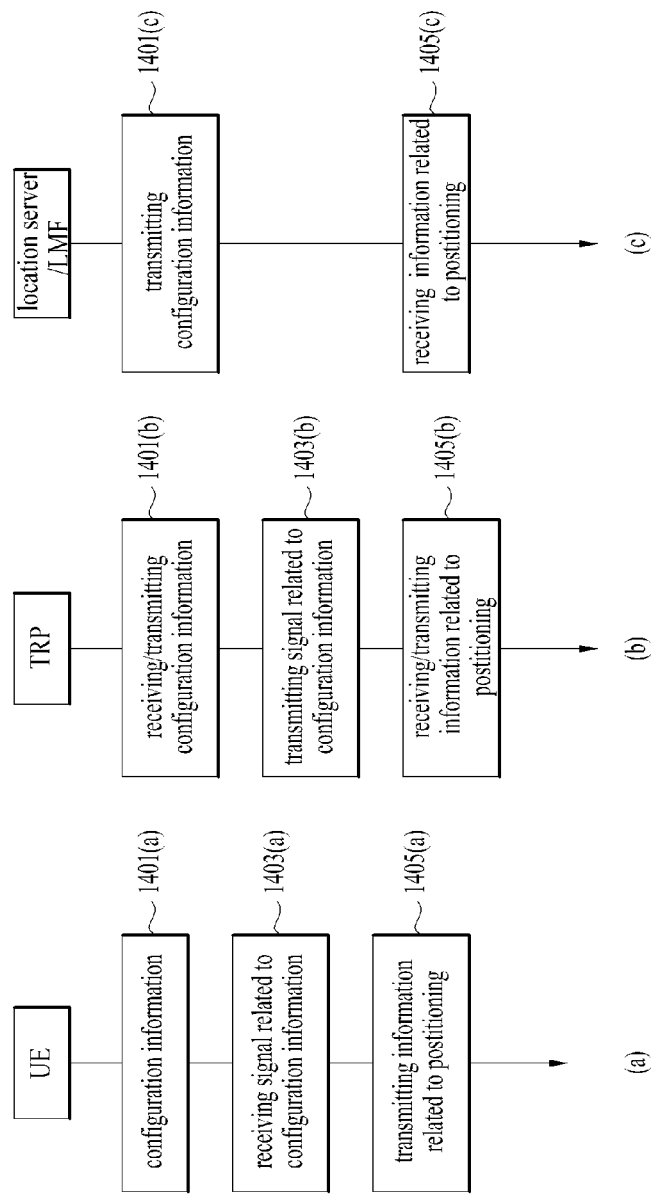
FIG. 14 is a simplified diagram illustrating a method of operating a UE, a TRP, a location server, and/or an LMF according to various embodiments.

FIG. 14 is a simplified diagram illustrating an operating method of a UE, a TRP, a location server, and/or an LMF according to various embodiments.

Referring to FIG. 14(a), in operation 1401(a) according to various embodiments, the UE may receive configuration information.

In operation 1403(a) according to various embodiments, the UE may receive a signal related to the configuration information.

In operation 1405(a) according to various embodiments, the UE may transmit information related to positioning.

Referring to FIG. 14(b), in operation 1401(b) according to various embodiments, the TRP may receive configuration information from the location server and/or the LMF and transmit the configuration information to the UE.

In operation 1403(b) according to various embodiments, the TRP may transmit a signal related to the configuration information.

In operation 1405(b) according to various embodiments, the TRP may receive information related to positioning and transmit the information related to positioning to the location server and/or the LMF.

Referring to FIG. 14(c), in operation 1401(c) according to various embodiments, the location server and/or the LMF may transmit configuration information.

In operation 1405(c) according to various embodiments, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of various embodiments below.

For example, the above signal related to positioning may be understood as a signal related to one or more pieces of information that the UE reports and/or a signal including one or more pieces of information that the UE reports, in a description of various embodiments below.

For example, in a description of various embodiments below, the BS, the gNB, and the cell may be replaced with the TRP, the TP, or any device serving equally as the TRP or the TP.

For example, in a description of various embodiments below, the location server may be replaced with the LMF and any device serving equally as the LMF.

More detailed operations, functions, terms, etc. in operation methods according to various embodiments may be performed and described based on various embodiments described later. The operation methods according to various embodiments are exemplary and one or more operations in the above-described operation methods may be omitted according to detailed content of each embodiment.

Hereinafter, various embodiments will be described in detail. It may be understood by those of ordinary skill in the art that the various embodiments described below may be combined in whole or in part to implement other embodiments unless mutually exclusive.

Proposal #1 [Reference Configuration and UE Reporting]

According to various embodiments, the UE may receive/obtain a reference configuration and/or reference configuration information for determining/selecting/obtaining a reference timing from the BS/location server/LMF.

According to various embodiments, the operation of the BS/location server/LMF and/or the operation of the UE may be defined as follows.

Embodiment 1

According to various embodiments, the UE may be configured/indicated with all and/or at least one of TRP/cell information (e.g., TRP/cell ID/index, etc.), a PRS resource set ID/index, and PRS resource ID/index information by reference configuration parameters (and/or parameters included in a reference configuration and/or reference configuration information). To this end, one or more of the following embodiments may be considered.

Case 1

According to various embodiments, the UE may select/use an indicated cell/BS/TRP to determine/configure/obtain a reference timing (and/or as reference information for configuring the reference timing).

According to various embodiments, the UE may select/use a cell/BS/TRP other than the indicated cell/BS/TRP to determine/configure/obtain the reference timing.

According to various embodiments, when the UE selects/uses a cell/BS/TRP other than the indicated cell/BS/TRP to determine/configure/obtain the reference timing, the UE may operate as follows. The following operations of the UE according to various embodiments may be configured/indicated by the BS/location server/LMF.

Option 1-1)

According to various embodiments, when the UE reports the reference information used by the UE, the UE may report only a TRP ID to the BS/location server/LMF. In the description of various embodiments, a TRP ID may be replaced with a cell ID and/or a BS ID, which may be applied not only to this section but also to all the descriptions of various embodiments.

According to various embodiments, the UE may select/use a cell/BS/TRP other than the indicated cell/BS/TRP to determine/configure/obtain the reference timing.

If the reliability/quality of a measurement (e.g., ToA) (particularly, the ToA of first arrival signal path) measured from a PRS transmitted from the configured/indicated cell/BS/TRP is poor (for example, if the reliability/quality is below a predetermined threshold), the UE may use/configure/determine a measurement (e.g., ToA (e.g., ToA of the first arrival signal path) measured from a PRS transmitted by another cell/BS/TRP as the reference timing.

Since the RSTD measurement is a time difference measurement between different cells/BSs/TRPs (and/or PRS resources), the reliability/quality of the reference timing may be quite important. If the reliability/quality of a PRS measurement from the cell/BS/TRP configured/indicated for the reference timing is poor, the UE may improve the reliability/quality of the reference timing by using/configuring another cell/BS/TRP for the reference timing.

Additionally/alternatively, the UE may not only determine/select/configure the reference timing based on a measurement obtained from a specific PRS resource set and/or PRS resource received from the selected cell/BS/TRP, but also determine the reference timing by combining all and/or at least some of the PRSs received from the selected cell/BS/TRP Option 1-2)

According to various embodiments, when the UE reports the reference information used by the UE, the UE may report a TRP ID (corresponding to a specific TRP) and/or a specific PRS resource set ID (in a specific PRS resource set) transmitted in the specific TRP (corresponding to the TRP ID) to the BS/location server/LMF. In this case, both the TRP ID and the PRS resource set ID may be reported, and/or at least one of the TRP ID and the PRS resource set ID may be reported.

According to various embodiments, when the UE selects/uses a cell/BS/TRP other than the indicated cell/BS/TRP to determine/configure/obtain the reference timing, if the UE selects/uses a cell/BS/TRP other than the indicated cell/BS/TRP to determine/configure/obtain the reference timing, and if the UE selects a specific PRS resource set associated with the corresponding cell/BS/TRP (e.g., another cell/BS/TRP), the UE may report only information on a TRP ID and PRS resource set without PRS resource information. According to various embodiments, the BS/location server/LMF may recognize/understand from the report that the UE determines/selects the reference timing by combining PRS resource measurements included in the specific PRS resource set.

Option 1-3)

According to various embodiments, when the UE reports the reference information used by the UE, the UE may report to the BS/location server/LMF a TRP ID (corresponding to a specific TRP), a specific PRS resource set ID (in a specific PRS resource set) transmitted by the specific TRP (corresponding to the TRP ID), and/or an PRS resource ID (of a PRS resource) included in the PRS resource set (corresponding to the specific PRS resource set ID). For example, all of the TRP ID, the PRS resource set ID, and the PRS resource ID may be reported, and/or at least one of the TRP ID, the PRS resource set ID, and the PRS resource ID may be reported.

According to various embodiments, when the UE selects/uses a cell/BS/TRP other than the indicated/configured cell/BS/TRP, and when the UE selects a specific PRS resource set associated with the corresponding cell/BS/TRP (e.g., another cell/BS/TRP) and/or a specific PRS resource included in the specific PRS resource set, the UE may report the specific PRS resource set and/or the specific PRS resource to the BS/location server/LMF. According to various embodiments, the BS/location server/LMF may recognize/understand that the UE uses/determines the reference timing based on the specific PRS resource (e.g., PRS transmitted in a specific Tx direction).

Case 2

According to various embodiments, the UE may select/use an indicated PRS resource set to determine/configure/obtain a reference timing (and/or as reference information for determining/configuring/obtaining the reference timing).

According to various embodiments, the UE may select/use a PRS resource set other than the indicated PRS resource set to determine/configure/obtain the reference timing.

According to various embodiments, when the UE selects/uses a configured/indicated TRP to determine/configure/obtain the reference timing, if the UE selects/uses a PRS resource set other than the configured/indicated PRS resource set, the UE may operate as follows (for example, the UE may operate as follows when reporting the reference information). The following operations of the UE according to various embodiments may be configured/indicated by the BS/location server/LMF.

Option 2-1)

According to various embodiments, the UE may report only a TRP ID to the BS/location server/LMF.

Option 2-2)

According to various embodiments, the UE may report to the BS/location server/LMF a TRP ID (corresponding to a specific TRP) and/or a specific PRS resource set ID transmitted by a specific TRP (corresponding to the TRP ID). For example, both the TRP ID and the PRS resource set ID may be reported, and/or at least one of the TRP ID and the PRS resource set ID may be reported.

Option 2-3)

According to various embodiments, the UE may report to the BS/location server/LMF a TRP ID (corresponding to a specific TRP), a specific PRS resource set ID transmitted by a specific TRP (corresponding to the TRP ID), and/or a PRS resource ID (of a PRS resource) included in the PRS resource set (corresponding to the specific PRS resource set ID). For example, all of the TRP ID, the PRS resource set ID, and the PRS resource ID may be reported, and/or at least one of the TRP ID, the PRS resource set ID, and the PRS resource ID may be reported.

Option 2-4)

According to various embodiments, the UE may report a PRS resource set ID and/or a PRS resource ID used by the UE to the BS/location server/LMF without TRP ID information. For example, the TRP ID information may not be reported, and/or the TRP ID information may not be included in the information reported by the UE.

Case 3

According to various embodiments, the UE may select/use an indicated PRS resource to determine/configure/obtain a reference timing (and/or as reference information for determining/configuring/obtaining the reference timing).

According to various embodiments, the UE may select/use a PRS resource other than the indicated PRS resource to determine/configure/obtain the reference timing.

According to various embodiments, when the UE selects/uses the configured/indicated TRP to determine/configure/obtain the reference timing, if the UE selects/uses a PRS resource other than the configured/indicated PRS resource, the UE may operate as follows (for example, the UE may operate as follows when reporting the reference information). The following operations of the UE according to various embodiments may be configured/indicated by the BS/location server/LMF.

Option 3-1)

According to various embodiments, the UE may report a PRS resource set ID and/or a PRS resource ID used by the UE to the BS/location server/LMF without TRP ID information. For example, both the PRS resource set ID and the PRS resource ID may be reported, and/or at least one of the PRS resource set ID and the PRS resource ID may be reported. In addition, the TRP ID information may not be reported, and/or the TRP ID information may not be included in the information reported by the UE.

Embodiment 2

According to various embodiments, the UE may be configured/indicated with only TRP/cell information (e.g., TRP/cell ID/index, etc.) by a reference configuration parameter (and/or a parameter included in a reference configuration and/or reference configuration information), but the UE may not be configured/indicated with information on a PRS resource set ID/index and PRS resource ID/index. To this end, one or more of the following embodiments may be considered.

Case A

According to various embodiments, the UE may select/use an indicated cell/BS/TRP to determine/configure/obtain a reference timing (and/or as reference information for configuring the reference timing).

According to various embodiments, the UE may select/use a cell/BS/TRP other than the indicated cell/BS/TRP to determine/configure/obtain the reference timing.

According to various embodiments, when the UE selects/uses a cell/BS/TRP other than the indicated cell/BS/TRP to determine/configure/obtain the reference timing, the UE may operate as follows. The following operations of the UE according to various embodiments may be configured/indicated by the BS/location server/LMF.

Option A-1)

According to various embodiments, when the UE reports the reference information used by the UE, the UE may report only a TRP ID to the BS/location server/LMF.

Option A-2)

According to various embodiments, when the UE reports the reference information used by the UE, the UE may report to the BS/location server/LMF a TRP ID and/or a specific PRS resource set ID (in a specific PRS resource set) transmitted by the corresponding TRP. For example, both the TRP ID and the PRS resource set ID may be reported, and/or at least one of the TRP ID and the PRS resource set ID may be reported.

Option A-3)

According to various embodiments, when the UE reports the reference information used by the UE, the UE may report to the BS/location server/LMF a TRP ID, a specific PRS resource set ID (in a specific PRS resource set) transmitted by the corresponding TRP, and/or a PRS resource ID (of a PRS resource) included in the PRS resource set (corresponding to the specific PRS resource set ID). For example, all of the TRP ID, the PRS resource set ID, and the PRS resource ID may be reported, and/or at least one of the TRP ID, the PRS resource set ID, and the PRS resource ID may be reported.

Case B

According to various embodiments, the UE may select/use a configured/indicated cell/BS/TRP to determine/configure/obtain a reference timing (and/or as reference information for configuring the reference timing). For example, the UE may select/use only information on the configured/indicated cell/BS/TRP to determine/configure the reference timing. To this end, one or more of the following embodiments may be considered (the following operations of the UE according to various embodiments may be configured/indicated by the BS/location server/LMF).

Option B-1)

According to various embodiments, the UE may report only a TRP ID to the BS/location server/LMF.

Case C

According to various embodiments, the UE may select/use a configured/indicated cell/BS/TRP to determine/configure/obtain a reference timing (and/or as reference information for configuring the reference timing). Additionally, according to various embodiments, the UE may select/use a PRS resource set and/or a PRS resource ID transmitted by the corresponding cell/BS/TRP.

To this end, one or more of the following embodiments may be considered (the following operations of the UE according to various embodiments may be configured/indicated by the BS/location server/LMF).

Option C-1)

According to various embodiments, the UE may report only a TRP ID to the BS/location server/LMF.

Option C-2)

According to various embodiments, the UE may report to the BS/location server/LMF a TRP ID and/or a specific PRS resource set ID (of a specific PRS resource set) transmitted by the corresponding TRP (corresponding to the TRP ID). For example, both the TRP ID and the PRS resource set ID may be reported, and/or at least one of the TRP ID and the PRS resource set ID may be reported.

Option C-3)

According to various embodiments, the UE may report to the BS/location server/LMF a TRP ID, a specific PRS resource set ID (of a specific PRS resource set) transmitted by the corresponding TRP, and/or a PRS resource ID (of a PRS resource) included in the PRS resource set (corresponding to the specific PRS resource set ID). For example, all of the TRP ID, the PRS resource set ID, and the PRS resource ID may be reported, and/or at least one of the TRP ID, the PRS resource set ID, and the PRS resource ID may be reported.

Option C-4)

According to various embodiments, the UE may report the PRS resource set ID of a PRS resource set used by the UE and/or the PRS resource ID of a PRS resource used by the UE to the BS/location server/LMF without TRP ID information. For example, both the PRS resource set ID and the PRS resource ID may be reported, and/or at least one of the PRS resource set ID and the PRS resource ID may be reported. In addition, the TRP ID information may not be reported, and/or the TRP ID information may not be included in the information reported by the UE.

Embodiment 3

Case 1

According to various embodiments, the UE may be configured/indicated with no configurations/indications by reference configuration parameters (and/or parameters included in a reference configuration and/or reference configuration information). According to various embodiments, the BS/location server/LMF may not provide any reference configuration information to be used by the UE to determine/select a reference timing.

For example, the BS/location server/LMF may transmit no reference configuration information. Additionally/alternatively, the BS/location server/LMF may not include all of TRP/cell information (e.g., TRP/cell ID/index, etc.) a PRS resource set ID/index, and PRS resource ID/index information (and/or other information to be used for configuring/determining the reference timing) in the transmitted reference configuration information.

To this end, one or more of the following embodiments may be considered (the following operations of the UE according to various embodiments may be configured/indicated by the BS/location server/LMF).

Option #1

According to various embodiments, the UE may report only a TRP ID to the BS/location server/LMF. Herein, the TRP ID may refer to TRP information used by the UE to determine/select the reference timing.

Option #2

According to various embodiments, the UE may report to the BS/location server/LMF a TRP ID and/or a specific PRS resource set ID (of a specific PRS resource set) transmitted by the corresponding TRP (corresponding to the TRP ID). For example, both the TRP ID and the PRS resource set ID may be reported, and/or at least one of the TRP ID and the PRS resource set ID may be reported.

Option #3

According to various embodiments, the UE may report to the BS/location server/LMF a TRP ID, a specific PRS resource set ID (of a specific PRS resource set) transmitted by the corresponding TRP, and/or a PRS resource ID (of a PRS resource) included in the PRS resource set (corresponding to the specific PRS resource set ID). For example, all of the TRP ID, the PRS resource set ID, and the PRS resource ID may be reported, and/or at least one of the TRP ID, the PRS resource set ID, and the PRS resource ID may be reported.

According to various embodiments, when the BS/location server/LMF does not configure a specific TRP, a specific PRS resource set, or a specific PRS resource to the UE, if the UE reports only a specific TRP ID, the BS/location server/LMF may recognize/understand that the UE determines/selects a reference timing based on a combination of measurements for all PRSs transmitted from the corresponding TRP (corresponding to the specific TRP ID).

Case 2

According to various embodiments, the BS/location server/LMF may configure/indicate only TRP information and PRS resource set information to the UE through a reference configuration parameter. According to various embodiments, the reference configuration parameter transmitted from the BS/location server/LMF to the UE may include TRP information and PRS resource set information, but the reference configuration parameter may not include PRS resource information.

To this end, one or more of the following embodiments may be considered (the following operations of the UE according to various embodiments may be configured/indicated by the BS/location server/LMF).

1) According to various embodiments, the UE may select the same TRP and PRS resource set. Additionally, the UE may select a PRS resource. For example, the same TRP and PRS resource set may mean a TRP and a PRS resource set corresponding to TRP information and PRS resource set information included in the reference configuration parameter. According to various embodiments, the UE may determine the reference timing by selecting the PRS resource included in the PRS resource set. According to various embodiments, when the UE reports the reference information used by the UE, the UE may report PRS resource information (additionally). For example, the UE may report the PRS resource information corresponding to the selected PRS resource. Additionally/alternatively, the UE may report information on at least one of the TRP, PRS resource set, and PRS resource.

2) According to various embodiments, the UE may select the same TRP and select a different PRS resource set. Additionally, the UE may select a PRS resource included in the selected PRS resource set. The same TRP may mean a TRP corresponding to TRP information included in the reference configuration parameter. The different PRS resource set may mean a PRS resource set different from a PRS resource set corresponding to PRS resource set information included in the reference configuration parameter. For example, the UE may report the PRS resource set information corresponding to the selected PRS resource set. Additionally/alternatively, the UE may report information on each of the selected PRS resource set and the selected PRS resource. Additionally/alternatively, the UE may report information on each of the TRP, selected PRS resource set, and selected PRS resource.

3) According to various embodiments, the UE may select a different TRP. The different TRP may mean a TRP different from a TRP corresponding to TRP information included in the reference configuration parameter. To this end, one or more of the following embodiments may be considered.

The UE may report a TRP ID as the reference information.

The UE may report a TRP ID+a PRS resource set ID as the reference information.

The UE may report a TRP ID+a PRS resource set ID+a PRS resource ID as the reference information.

The UE may report a TRP ID+a PRS resource ID as the reference information.

The UE may report a TRP ID corresponding to the selected different TRP. Additionally/alternatively, the UE may report a TRP ID and a PRS resource set ID corresponding to the selected different TRP. Additionally/alternatively, the UE may report a TRP ID, a PRS resource set ID, and a PRS resource ID corresponding to the selected different TRP. Additionally/alternatively, the UE may report a TRP ID and a PRS resource ID corresponding to the selected different TRP. For example, a PRS resource corresponding to the PRS resource ID may be included in a PRS resource set corresponding to the PRS resource set ID, and the PRS resource and the PRS resource set may be associated with a TRP corresponding to the TRP ID.

Case 3

According to various embodiments, the BS/location server/LMF may configure/indicate only TRP information to the UE through a reference configuration parameter. According to various embodiments, the TRP information may be included in the reference configuration parameter transmitted from the BS/location server/LMF to the UE, but PRS resource set information and PRS resource information may not be included therein.

To this end, one or more of the following embodiments may be considered (the following operations of the UE according to various embodiments may be configured/indicated by the BS/location server/LMF).

According to various embodiments, the UE may select a specific PRS resource set associated with a TRP (e.g., a TRP corresponding to the TRP information) and use the specific PRS resource set to determine a reference timing. According to various embodiments, the UE may report PRS resource set information (corresponding to the specific PRS resource set) to the BS/location server/LMF together with the TRP information. Additionally/alternatively, according to various embodiments, the UE may report the PRS resource set information and/or TRP information to the BS/location server/LMF.

According to various embodiments, the UE may select a specific PRS resource set and a specific PRS resource associated with a TRP and use the specific PRS resource set and specific PRS resource to determine a reference timing. According to various embodiments, the UE may report PRS resource set information (corresponding to the specific PRS resource set) and PRS resource information (corresponding to the specific PRS resource) to the BS/location server/LMF together with the TRP information. Additionally/alternatively, according to various embodiments, the UE may report the PRS resource set information, PRS resource information, and/or TRP information to the BS/location server/LMF.

According to various embodiments, the UE may select a specific PRS resource associated with a TRP and use the specific PRS resource to determine a reference timing. According to various embodiments, the UE may report PRS resource information (corresponding to the specific PRS resource) to the BS/location server/LMF together with the TRP information. Additionally/alternatively, according to various embodiments, the UE may report the PRS resource information and/or TRP information to the BS/location server/LMF.

Proposal #2 [Reference Configuration with UE RX Beam(s)/Panel(s)]

According to various embodiments, the UE may receive/obtain a reference configuration and/or reference configuration information from the BS/location server/LMF to determine/select/obtain a reference timing. According to various embodiments, the UE may receive from the BS/location server/LMF a reference related configuration for determining/selecting/obtaining the reference timing in order to obtain/estimate the location of the UE according to UE positioning techniques based on timing measurements such as DL-TDOA (OTDOA), multi-cell RTT, etc.

According to various embodiments, the reference related configuration (and/or reference configuration) may include information on a specific TRP/cell and/or information on a DL RS transmitted from the specific TRP/cell.

The DL RS information may include DL PRS resource set information (e.g., ID, index, etc.), SS/PBCH block information (e.g., ID, index, etc.), CSI-RS resource information (e.g., ID, index, etc.), CSI-RS resource set information (e.g., ID, index, etc.). For example, a CSI-RS resource set may include one or more CSI-RS resources.

Additionally/alternatively, according to various embodiments, the reference configuration may additionally include information on a specific Rx beam of the UE and/or information on a specific transmission/reception (Rx/Tx) panel of the UE (antenna group information and/or antenna element information). According to various embodiments, the reference configuration may include information for configuring a reference Rx beam and/or a reference Rx/Tx panel (reference antenna group and/or reference antenna element in order to obtain the reference timing based on the specific Rx beam and/or specific Rx/Tx panel (antenna group and/or antenna element) of the UE.

Information on the Rx beam of the UE may be set to information on a specific SRS resource (e.g., ID, index, etc.) and/or information on an SRS resource set (e.g., ID, index, etc.). The information on the Rx beam of the UE may include the information on the specific SRS resource information and/or the information on the SRS resource set. The SRS resource set may include one or more SRS resources. That is, the UE may be instructed/configured to set the Rx beam direction to the direction of a Tx beam on which the specific SRS resource is transmitted.

Information the specific Rx/Tx panel (antenna group and/or antenna element) of the UE may correspond to a specific ID/index assigned to the panel and/or the ID/index for a group of antennas (antenna elements).

The UE may be configured with one or more Rx/Tx panels (antenna groups and/or antenna elements). An ID/index may be assigned to each of the one or more Rx/Tx panels (antenna groups and/or antenna elements) and/or different IDs/indices may be assigned to the one or more Rx/Tx panels (antenna groups and/or antenna elements) so that the one or more Rx/Tx panels (antenna groups and/or antenna elements) may be identified. For example, information on a specific Rx/Tx panel (antenna group and/or antenna element) of the UE may be one or more IDs/indices among the indices of the one or more Rx/Tx panels (antenna groups and/or antenna elements).

Proposal #3 [Reference Information Reporting with UE RX Beam(s)/Panel(s)]

According to various embodiments, the UE may report information used by the UE to determine/obtain/select a reference timing to the BS/location server/LMF. According to various embodiments, the UE may report at least one of the following information used by the UE to determine/obtain/select the reference timing.

Information on TRP/cell (e.g., TRP/cell ID/index)
Information on DL RS (e.g., PRS resource set ID/index, PRS resource ID/index, SS/PBCH block (ID/index), etc.)
Information on Tx/Rx beam of UE (e.g., ID/index) and/or information on Rx/Tx panel/antenna group of UE (e.g., ID/index)

According to various embodiments, the UE may report other information used by the UE to determine/obtain the reference timing to the BS/location server/LMF in addition to the above-described information.

According to various embodiments, the UE may report information not configured by the BS/location server/LMF. For example, the UE may report, as the information not configured by the BS/location server/LMF, the information used by the UE to determine/obtain the reference timing to the BS/location server/LMF.

According to various embodiments, the UE may receive information from the BS/location server/LMF, but the UE may use other information and report the other information. For example, the UE may determine/obtain the reference timing based on information different from the information configured by the BS/location server/LMF. In this case, the UE may report the different information used to determine/obtain the reference timing to the BS/location server/LMF.

For example, the BS/location server/LMF may provide the UE with at least one of a TRP ID, a DL PRS resource set ID, and/or a PRS resource ID as a reference configuration. For example, the UE may use a specific Rx beam and/or a specific Rx panel/antenna group together with the above information. The UE may report the corresponding information (information on the specific Rx beam and/or information on the specific Rx panel/antenna group/antenna element) to the BS/location server/LMF along with the TRP ID, DL PRS resource set ID, and/or DL PRS resource ID. Additionally/alternatively, when the UE uses the configured information without changing the information, the UE may report the additionally used information only. For example, when the UE uses the configured information without changing the information, the UE may report the additionally used information and/or changed information without reporting the unchanged information.

In the above example (i.e., when the UE uses the configured TRP ID, DL PRS resource set ID, and/or DL PRS resource ID as it is), if the UE reports the information used to obtain/determine the reference timing, the UE may report only the Rx beam information and/or the Rx panel/antenna group/antenna element information to the BS/location server/LMF.

Additionally/alternatively, among reference configuration parameters configured by the BS/location server/LMF, the UE may report parameters changed and/or additionally used by the UE to the network. That is, among the reference configuration parameters configured by the BS/location server/LMF, the UE may report information on the changed/added parameters without reporting the parameters used as they are.

For example, when the BS/location server/LMF instructs the UE to use a specific TRP, TRP #1 and antenna panel #1 of the UE through the reference configuration, if the measurement quality of a PRS transmitted from TRP #2 is good (for example, if the measurement quality of the PRS transmitted from TRP #2 is above/below a predetermined threshold, and/or if the measurement quality of a PRS transmitted from TRP #1 is above/below a predetermined threshold), the UE may use TRP #2 as the reference, instead of using TRP #1. In this case, if the UE uses antenna panel #1 of the UE for TRP #2, the UE may report information on the changed TRP only when reporting the reference configuration parameters to the network because the UE changes and uses only the TRP among those configured by the reference configuration parameters. That is, the UE may report information on TRP #2 without reporting information on other parameters such as antenna panels. For example, the PRS measurement quality may include the measurement quality and/or reliability of a bit error ratio (BER), block error ratio (BLER), RSRP, RSRQ, SNR, SINR, RSTD, ToA, and/or propagation delay time. Additionally/alternatively, the PRS measurement quality may be defined as an error value generated when the location of the UE is calculated/obtained based on PRS measurement results. Additionally/alternatively, when the UE reports the quality, the UE may report an error (e.g., distance error) that may occur when the location is calculated/obtained based on the measurement.

As another example, if the UE uses antenna panel #2 for TRP #2, the UE may report information on the changed TRP and information on the changed antenna panel when reporting the reference configuration parameters to the network. That is, the UE may report information on TRP #2 and information on antenna panel #2. The antenna panel may be selected based on the PRS measurement quality. For example, when the measurement quality of a PRS received by antenna panel #2 is above/below a predetermined threshold and/or when the measurement quality of a PRS received by antenna panel #1 is above/below a predetermined threshold, the UE may select antenna panel #2.

According to various embodiments, the UE may report changed parameters only, thereby preventing inefficient use of data/resources caused when the UE reports redundant data.

Embodiments

Hereinafter, some examples of the various embodiments described above will be described. The content already mentioned in the various embodiments will be omitted. For more specific details, reference may be made to the description of the various embodiments. For example, reference may be made to Proposal #2 and/or Proposal #3 described above.

According to various embodiments, panels/antenna groups/antenna elements may be identified/distinguished by the ID/index assigned to each panel/antenna group/antenna element.

Table 7 shows at least parts of the IE DL-PRS-ID-Info.

TABLE 7

DL-PRS-ID-Info
The IE DL-PRS-ID-Info provides the IDs of the reference TRPs' DL-PRS Resources.

```
-- ASN1START
DL-PRS-ID-Info-r16 ::= SEQUENCE {
        dl-PRS-ID-r16                    INTEGER (0..255),
        nr-DL-PRS-ResourceID-List-r16    SEQUENCE (SIZE (1 .. nrMaxResourceIDs-r16)) OF
            NR-DL-PRS-ResourceID-r16                    OPTIONAL,
        nr-DL-PRS-ResourceSetID-r16      NR-DL-PRS-ResourceSetID-r16
                                                        OPTIONAL
        RX-antenna-groupID               INTEGER (0..3)
}
-- ASN1STOP
```

For example, dl-PRS-ID-r16 may correspond to a TRP ID.

For example, nr-DL-PRS-ResourceSetID-r16 may correspond to the ID of a specific DL PRS resource set among one or more DL PRS resource sets configured for the UE.

For example, nr-DL-PRS-ResourceID-r16 may correspond to the ID of a specific DL PRS resource included in a DL PRS resource set (nr-DL-PRS-ResourceSetID-r16).

According to various embodiments, Rx-antenna-groupID may mean a specific Rx panel and/or specific Rx antenna group of the UE. According to various embodiments, Rx-antenna-groupID may be the ID of an Rx panel or Rx antenna group of the UE.

According to various embodiments, the range of the value of Rx-antenna-groupID may vary depending on the number of Rx panels/antenna groups of the UE. For example, when the number of Rx panels/antenna groups of the UE is 4, Rx-antenna-groupID may be an integer value from 0 to 3. For example, when the number of Rx panels/antenna groups of the UE is N, Rx-antenna-groupID may be an integer value from 0 to N−1 (and/or 1 to N). For example, when the number of Rx panels/antenna groups of the UE is N, an ID/index from 0 to N−1 (and/or from 1 to N) may be assigned to the Rx panel/antenna group of the UE. In this case, an Rx panel/antenna group with an ID/index corresponding to the value of Rx-antenna-groupID may be configured/indicated for a reference timing. If an Rx panel/antenna group used by the UE for the reference timing is different from that configured/indicated for the reference timing, the UE may report the ID/index of the Rx panel/antenna group used by the UE.

According to various embodiments, an RS may be used to identify/distinguish a panel/antenna group/antenna element. For example, an SRS may be used.

Table 8 shows at least parts of the IE DL-PRS-ID-Info.

TABLE 8

DL-PRS-ID-Info
The IE DL-PRS-ID-Info provides the IDs of the reference TRPs' DL-PRS Resources.

```
-- ASN1START
DL-PRS-ID-Info-r16 ::= SEQUENCE {
        dl-PRS-ID-r16                    INTEGER (0..255),
        nr-DL-PRS-ResourceID-List-r16    SEQUENCE (SIZE (1..nrMaxResourceIDs-r16)) OF
            NR-DL-PRS-ResourceID-r16                    OPTIONAL,
        nr-DL-PRS-ResourceSetID-r16      NR-DL-PRS-ResourceSetID-r16
                                                        OPTIONAL
        RX-antenna-groupID               SRS-Resource-SetID
}
-- ASN1STOP
```

For example, dl-PRS-ID-r16 may correspond to a TRP ID.

For example, nr-DL-PRS-ResourceSetID-r16 may correspond to the ID of a specific DL PRS resource set among one or more DL PRS resource sets configured for the UE.

For example, nr-DL-PRS-ResourceID-r16 may correspond to the ID of a specific DL PRS resource included in a DL PRS resource set (nr-DL-PRS-ResourceSetID-r16).

According to various embodiments, SRS-Resource-SetID may be the ID of an SRS resource set configured for positioning. Additionally/alternatively, according to various embodiments, SRS-Resource-SetID may be the ID of a MIMO SRS resource set configured for channel estimation/beam management.

According to various embodiments, the SRS resource set ID may be connected/associated with a specific panel of the UE. For example, the BS/location server/LMF may configure for the UE that a specific SRS resource set, SRS resource set #1 is associated with antenna group #1 of the UE and SRS resource set #2 is associated with antenna group #2 of the UE. For example, the antenna group of the UE may be identified by the ID of each SRS resource set associated therewith.

For example, if the number of Rx panels/antenna groups of the UE is N, SRS-Resource-SetID may indicate one of the N values. For example, if the number of Rx panels/antenna groups of the UE is N, different IDs/indices may be assigned to the Rx panels/antenna groups of the UE, an Rx panel/antenna group with an ID/index corresponding to the value of SRS-Resource-SetID may be configured/indicated for a reference timing. When an Rx panel/antenna group used by the UE for the reference timing is different from that configured/indicated for the reference timing, the UE may report the ID/index of the Rx panel/antenna group used by the UE and/or the ID/index of an SRS resource set associated therewith.

Embodiment—Related to Panel

According to various embodiments, the "panel" of the UE may be a group of multiple antenna elements.

According to various embodiments, the antenna panel/antenna group may be identified by a specific ID/index. Additionally/alternatively, according to various embodiments, the antenna panel/antenna group may be identified/distinguished by a specific UL RS (e.g., SRS) resource set ID. For example, a specific SRS resource set ID/index may identify a specific panel of the UE.

In the description of various embodiments, the panel of the UE may mean a panel for transmitting a signal (Tx panel) and/or a panel for receiving a signal (Rx panel).

Figure 15:
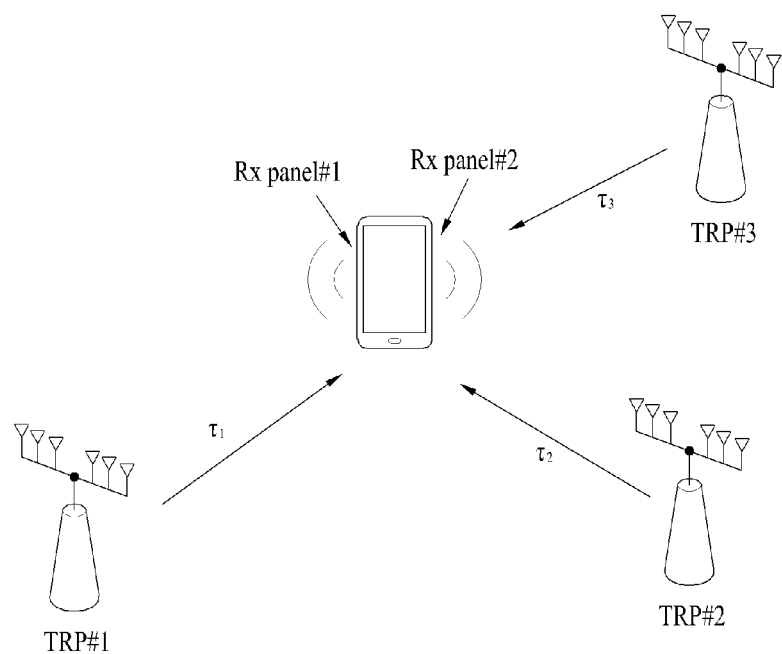
FIG. 15 is a diagram illustrating an exemplary configuration of a reception antenna panel of a UE according to various embodiments.

FIG. 15 is a diagram illustrating an exemplary configuration of an Rx antenna panel of a UE according to various embodiments.

The necessity of various embodiments will be described with reference to FIG. 15.

Figure 18:
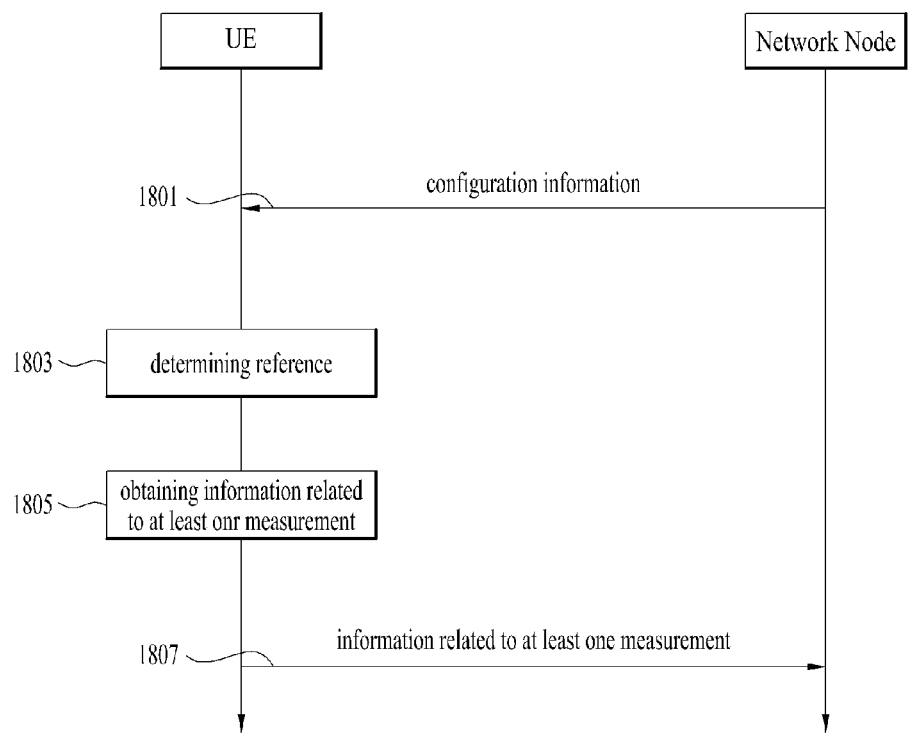
FIG. 18 is a diagram schematically illustrating a method of operating a UE and a network node according to various embodiments.

Referring to FIG. 15, the UE may have two Rx panels. For example, due to hardware implementation characteristics (e.g., group delay, etc.), each Rx panel may have an additional timing delay/error: $\tau_{RX_1}$ and/or $T_{RX_2}$ in addition to a propagation time. For example, FIG. 18 illustrates that the UE acquires an RSTD measurement for TRP #1 and TRP #3 and an RSTD measurement for TRP #2 and TRP #3.

For example, when the UE measures/acquires an RSTD measurement for TRP #2 and TRP #3, the timing delays/errors of Rx panel #2 may offset each other due to use of Rx panel #2, and thus no error may occur in the RSTD measurement.

For example, when the UE measures/acquires an RSTD measurement for TRP #1 and TRP #3, Rx panel #1 and Rx panel #2 may be used for the TRPs. Accordingly, for example, a delay/error occurring in the Rx panel in the RSTD measurement may be included.

According to various embodiments, for example, when Rx panel #2 and TRP #3 of the UE are used as a reference configuration to acquire a reference timing to acquire RSTD measurement, the UE may measure/report the RSTD measurement between TRP #1 and/or TRP #3 using when Rx panel #2 used by the UE as the reference configuration.

The use of an antenna panel of a UE applicable to various embodiments will be described.

For example, a panel of the UE suitable for each cell/BS/TRP may vary according to the orientation/position of the UE and/or the orientation/position of the cell/BS/TRP. Accordingly, for example, a specific panel of the UE suitable for signal transmission/reception with a specific cell/BS/TRP may be selectively used at a specific time. Additionally/alternatively, for example, antenna panels of the UE suitable for cells/BSs/TRPs may be simultaneously used for simultaneous wireless communication of the different cells/BSs/TRPs.

For example, when there is only one panel of the UE at a specific position, the beam direction that may be formed on the panel of the UE may not be suitable for a cell/BS/TRP that needs to transmit and receive a radio signal. That is, for example, a decrease in data transfer rate and/or a decrease in measurement accuracy between the UE and the cell/BS/TRP may be caused.

Therefore, for example, it may be necessary to mount multiple antenna panels at various positions (e.g., corners/faces) of the UE such as a smartphone. However, for example, timing delay may vary due to different lengths cables connected between different antenna panels and the modem. Therefore, for example, it may be necessary to overcome/compensate for such delay characteristics in UE positioning.

For example, even for the same TRP, a timing measurement related to positioning may vary for each panel of the UE due to a group delay, depending on the hardware characteristics of the antenna panel of the UE. Therefore, which antenna panel the UE uses to measure the reference timing may be important in positioning, and various embodiments may be considered as a solution.

In the description of various embodiments, a panel of the UE may be multiple antenna elements, and/or a group/configure of antenna elements mounted on the UE. For example, the panel of the UE may be a specific physical panel/antenna group. For example, for the panel of the UE, a logical bundle of multiple antennas may be used as one group. In the description of various embodiments, the panel of the UE may be expressed as an "antenna group" or an "antenna element" in addition to the "panel". According to various embodiments, a method of separating/distinguishing an antenna group by grouping antenna elements and assigning a specific identifier/ID thereto may be introduced. According to various embodiments, a plurality of antenna elements may be distributed into one or more groups, and the one or more groups may be identified/distinguished from each other by the specific identifier/ID.

Multiple Panels

Hereinafter, multiple panels (multi-panel) according to various embodiments will be described. For example, the various embodiments may be related to multi-panel operations/multi-panel definitions/multi-panel related details.

According to various embodiments, the term "panel" may refer to a group of multiple antenna elements.

Additionally/alternatively, in the description of various embodiments, the term "panel" may mean one or more panels (at least one panel and/or multiple panels) and/or a panel group (having a similarity/common value in terms of specific characteristics (e.g., TA, power control parameters, etc.)).

Additionally/alternatively, in the description of various embodiments, the term "panel" may mean one or more antenna ports (at least one antenna port and/or multiple antenna ports), an antenna port group, and/or a UL resource group/set (having a similarity/common value in terms of specific characteristics (e.g., TA, power control parameters, etc.) (e.g., when the difference between values related to the specific characteristic is within a predetermined range and/or below a predetermined threshold)).

Additionally/alternatively, in the description of various embodiments, the term "panel" may mean one or more beams (at least one beam and/or multiple beams), an antenna port group, and/or one or more beam groups/sets (at least one beam group/set and/or multiple beam groups/sets) (having a similarity/common value in terms of specific characteristics (e.g., TA, power control parameters, etc.)).

Additionally/alternatively, in the description of various embodiments, the term "panel" may be defined as a unit for the UE to configure/set a Tx/Rx beam. For example, the term "Tx panel" may be defined as a unit for using one beam among a plurality of Tx beams, which are generated by one panel, for transmission at a specific time. That is, only one Tx beam (e.g., spatial relation information RS) may be used for each Tx panel to transmit a specific UL signal/channel.

Additionally/alternatively, in the description of various embodiments, the term "panel" may mean one or more antenna ports (at least one antenna port and/or multiple antenna ports), an antenna port group, and/or a UL resource group/set having common/similar UL synchronization (e.g., when the difference in UL synchronization is less than or equal to a predetermined range/threshold).

Additionally/alternatively, in the description of various embodiments, the term "panel" may be replaced with an uplink synchronization unit (USU) in general.

Additionally/alternatively, in the description of various embodiments, the term "panel" may be replaced with an uplink transmission entity (UTE) in general.

Additionally/alternatively, in the description of various embodiments, the expression of "uplink resource (and/or resource group/set)" may be replaced with a PUSCH/PUCCH/SRS/PRACH resource (and/or resource group/set).

Additionally/alternatively, in the description of various embodiments, when it is said that something may be replaced, it may be interpreted to mean that the thing may be modified and applied, and vice versa. That is, in the description of various embodiments, when it is said that something may be modified and applied, it may be interpreted to mean that the thing may be modified and applied in reverse.

Additionally/alternatively, in the description of various embodiments, the term "antenna (and/or antenna port)" may refer to a physical and/or logical antenna (and/or antenna port).

Additionally/alternatively, in the description of various embodiments, the term "panel" may be variously interpreted as follows: a group of antenna elements of a UE, a group of antenna ports of a UE, and/or a group of logical antennas of a UE. For example, which physical/logical antennas and/or antenna ports are bundled and mapped to one panel may be determined in various ways by considering the location/distance/correlation/radio frequency (RF) configuration/antenna (port) virtualization between antennas. For example, such a mapping process may vary according to UE implementation.

Additionally/alternatively, in the description of various embodiments, the term "panel" may mean a plurality of panels and/or a panel group (having a similarity in terms of specific characteristics (e.g., when the difference between values related to the specific characteristic is within a predetermined range and/or below a predetermined threshold)).

Multi-Panel Structure

According to various embodiments, UE modeling where a plurality of panels (configured with one or more antennas) is mounted may be considered when the UE is implemented in high frequency bands. For example, two bi-directional panels may be considered in 3GPP UE antenna modeling.

According to various embodiments, various forms may be considered when implementing a plurality of UE panels. In the description of various embodiments, although it is assumed that the UE supports a plurality of panels, the embodiments may also be applied to a BS (e.g., TRP, etc.) supporting a plurality of panels.

Figure 16:
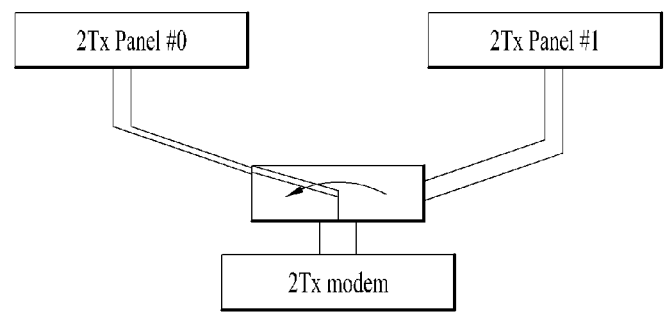
FIG. 16 is a diagram illustrating an exemplary multi-panel structure according to various embodiments.

According to various embodiments, the multi-panel structure may be applied when signals and/or channels are transmitted and received based on multiple panels FIG. 16 is a diagram illustrating an exemplary multi-panel structure according to various embodiments.

Referring to FIG. 16, according to various embodiments, the multi-panel structure may be implemented based on RF switching (multi-panel UE implementation based on RF switching).

For example, only one panel may be activated at one instance (a specific instance). To switch the activated panel (e.g., panel switching, etc.), signal transmission may not be allowed for a predetermined period of time.

Figure 17:
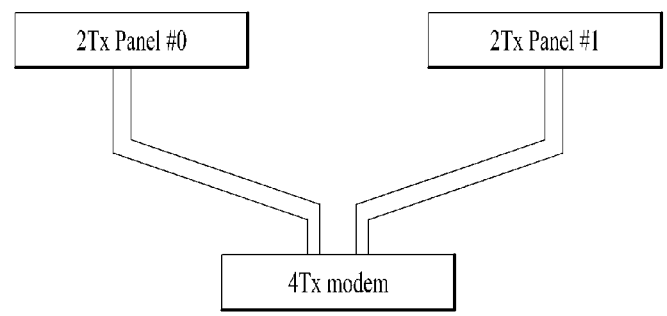
FIG. 17 is a diagram illustrating an exemplary multi-panel structure according to various embodiments.

FIG. 17 is a diagram illustrating an exemplary multi-panel structure according to various embodiments.

Referring to FIG. 17, according to various embodiments, the multi-panel structure may be implemented based on RF connection (multi-panel UE implementation based on RF connection).

For example, RF chains may be connected to each other so that each panel may be activated at any time (any time/always). For example, the time required for panel switching may be zero and/or very small (e.g., a time that may be approximated to 0, a time below a prescribed threshold, etc.). Depending on the configuration of a modem and/or power amplifier, a plurality of panels may be simultaneously activated to transmit signals (for example, simultaneous transmission across multiple panels (STxMP)).

When the UE has a plurality of panels, each panel may have a different radio channel state. Additionally/alternatively, each antenna panel may have a different RF/antenna configuration Therefore, there is a need for a method of estimating a channel for each panel.

For measurement of UL quality and/or management of UL beams and/or measurement of DL quality for each panel and/or management of DL beams based on channel reciprocity, a process in which one and/or a plurality of SRS resources are transmitted for each panel may be required. For example, the plurality of SRS resources may be SRS resources transmitted on different beams within one panel and/or SRS resources repeatedly transmitted on the same beam.

For convenience of description, a set of SRS resources transmitted on the same panel (e.g., based on specific usage parameters (e.g., beam management, antenna switching, codebook-based PUSCH, non-codebook based PUSCH, etc.) and specific time-domain behaviors (e.g., aperiodically, semi-persistently, and/or periodically) may be referred to as an SRS resource group. That is, the SRS resource group may correspond to a set of SRS resources supported in a wireless communication system to which various embodiments are applicable (e.g., NR system supporting Release 15, etc.). Additionally/alternatively, the SRS resource group may be separately configured by binding one and/or a plurality of SRS resources having the same time domain behavior and usage.

For the same usage and time domain behavior in the NR system supporting Release 15, a plurality of SRS resource sets may be configured only when the usage is beam management. For example, it may be defined that simultaneous transmission is not allowed on SRS resources configured in the same SRS resource set, but simultaneous transmission may be allowed between SRS resources belonging to different SRS resource sets. Accordingly, considering the panel implementation shown in FIG. 17 and/or simultaneous transmission on a plurality of panels, the concept of an SRS resource set may match an SRS resource group, but separate SRS resource groups may be defined in consideration of the implementation shown in FIG. 16 such as panel switching. For example, a specific ID may be given to each SRS resource, resources with the same ID may belong to the same SRS resource group, and resources with different IDs may belong to different resource groups.

For example, it may be assumed that the UE is configured with four SRS resource sets configured for BM (e.g., the RRC parameter usage is set to 'BeamManagement') (for convenience, the four SRS resource sets may be called SRS resource sets A, B, C, and D). Since a total of four (Tx) panels are implemented for the UE, it may be considered that SRS transmission is performed by matching each SRS resource set to one (Tx) panel. For example, a wireless communication system supporting Release-15, may support the UE implementation shown in Table 9.

TABLE 9

Add the following clarification to FG 2-30 that limit the number of SRS resource sets per supported time domain behaviour.

| Maximum number of SRS resource sets across all time domain behaviour (periodic/semi-persistent/aperiodic) reported in 2-30 | Additional constraint on the maximum number of SRS resource sets per supported time domain behaviour (periodic/semi-persistent/aperiodic) |
| --- | --- |
| 1 | 1 |
| 2 | 1 |
| 3 | 1 |
| 4 | 2 |
| 5 | 2 |
| 6 | 2 |
| 7 | 4 |
| 8 | 4 |

In Table 9, if the UE reports as its capability a value of 7 or 8 for feature groups (FG) 2 to 30, transmission may be performed as follows: a total of up to four SRS resource sets for BM (for each supported time-domain behavior) may be configured as shown in the right column, and one UE panel may correspond to each set for the transmission.

For example, when the four-panel UE performs transmission as follows: each panel corresponds to one SRS resource set for BM, the number of SRS resources configurable for each set may also be supported by separate UE capability signaling.

It may be assumed that two SRS resources are configured in each set. This may correspond to the number of UL beams capable of being transmitted per each panel. For example, when four panels are implemented, the UE may transmit two UL beams on two configured SRS resources for each panel. In this case, in the wireless communication system supporting Release-15, either CB-based UL mode or NCB-based UL mode may be configured. For example, in the wireless communication system that supports Release-15, only a single SRS resource set (with usage set to "CB-based UL" or "NCB-based UL")), i.e., only one dedicated SRS resource set (for a PUSCH) may be supported regardless of cases/configurations, Multi-Panel UE (MPUE) Category According to various embodiments, the following three MPUE categories may be considered for the above-described multi-panel operation. According to various embodiments, the three MPUE categories may be divided according to at least one of (i) whether multiple panels are activated and/or (ii) whether transmission based on multiple panels is allowed.

MPUE Category 1

When the UE has multiple panels implemented therein, the UE may activate only one panel at a time. For example, the delay for panel switching/activation may be set to [X] ms (where X is a real number, an integer greater than or equal to 0, an integer, and/or a natural number). The delay may be set longer than the delay for beam switching/activation and configured in units of symbols and/or slots. MPUE category 1 may be replaced with MPUE-assumption 1.

MPUE Category 2

When the UE has multiple panels implemented therein, the UE may activate the multiple panels at a time and use one or more panels for transmission. For example, simultaneous transmission based on panels may be allowed in the corresponding category. MPUE category 2 may be replaced with MPUE-assumption 2.

MPUE Category 3

When the UE has multiple panels implemented therein, the UE may activate the multiple panels at a time but use only one panel for transmission. MPUE category 3 may be replaced with MPUE-assumption 3.

According to various embodiments, one or more of the above-described three MPUE categories may be supported for transmission/reception of signals and/or channels based on multiple panels.

For example, MPUE category 3 among the three MPUE categories may be (optionally) supported in the wireless communication system supporting Release-16.

For example, information on the MPUE category may be predefined by standards (specifications). Accordingly, the information on the MPUE category may be known in advance by the UE and/or the network without separate configuration/indication.

Additionally/alternatively, the information on the MPUE category may be indicated/configured semi-statically or dynamically depending on the state of the system (e.g., from the perspective of the network and/or UE). The configuration/indication related to transmission/reception of signals and/or channels based on multiple panels may be configured/indicated in consideration of the MPUE category.

Configuration/Indication Related to Panel-Specific Transmission/Reception

According to various embodiments, transmission/reception of signals and/or channels may be performed panel-specifically. Panel-specific transmission/reception may mean that transmission/reception of signals and/or channels are performed in units of panels. For example, panel-specific transmission/reception may be referred to as panel-selective transmission/reception.

According to various embodiments, identification information (e.g., identifier (ID), indicator, etc.) may be used for panel-specific transmission/reception in operation based on multiple panels. Hereinafter, a panel ID will be described as an example of identification information for configuring and/or indicating a panel, but this may be replaced with identification information, an indicator, etc.

For example, the ID of a panel among a plurality of activated panels may be used for panel-selective transmission of a PUSCH, a PUCCH, an SRS, and/or a PRACH.

According to various embodiments, the panel ID may be configured/defined based on at least one of the following four alternatives (Alts. 1, 2, 3, and 4).

Alt.1

According to various embodiments, the panel ID may be an SRS resource set ID.

For example, considering the following cases: a) when SRS resources in several SRS resource sets having the same time-domain operation are simultaneously transmitted in the same BWP, b) when a power control parameter is configured in units of SRS resource sets, c) when the UE supports a maximum of four SRS resource sets (corresponding to up to four panels) depending on the supported time-domain operation, each UE Tx panel may correspond to an SRS resource set configured in terms of the UE implementation.

For Alt.1, the SRS resource set associated with each panel may be used for PUSCH transmission based on 'codebook' and 'non-codebook'.

For Alt.1, several SRS resources belonging to several SRS resource sets may be selected by extending the SRI field of DCI.

For example, an SRI-to-SRS resource mapping table may need to be extended to include SRS resources in all the SRS resource sets.

Alt.2

According to various embodiments, the panel ID may be an ID (directly) associated with a reference RS resource and/or reference RS resource set.

Alt.3

According to various embodiments, the panel ID may be an ID (directly) associated with a target RS resource and/or target RS resource set.

For Alt.3, a configured SRS resource set corresponding to one UE Tx panel may be easily controlled, and the same panel ID may be assigned to multiple SRS resource sets with different time-domain operations.

Alt.4

According to various embodiments, the panel ID may be an ID additionally configured for spatial relation information (e.g., RRC_SpatialRelationInfo).

Alt.4 may correspond to a method of newly adding information for indicating the panel ID. For example, in this case, a configured SRS resource set corresponding to one UE Tx panel may be easily controlled, and the same panel ID may be assigned to multiple SRS resource sets with different time-domain operations.

For example, a UL TCI may be introduced in relation to a DL TCI. UL TCI state definitions may include a list of reference RS resources (e.g., SRS, CSI-RS, and/or SSB). For example, the SRI field may be reused to select a UL TCI state from the configured set, and/or a new DCI field (e.g., UL-TCI field) in DCI (e.g., DCI format 0_1) may be defined for the same purpose.

According to various embodiments, the above-described panel-specific transmission/reception related information (e.g., panel ID, etc.) may be provided by higher layer signaling (e.g., RRC message, MAC-CE, etc.) and/or lower layer signaling (e.g., L1 signaling, DCI, etc.). According to various embodiments, the corresponding information may be transmitted from the BS (and/or network node) to the UE and/or from the UE to the BS (and/or network node) according to circumstances or needs.

Additionally/alternatively, according to various embodiments, the corresponding information may be configured in a hierarchical manner as follows: a set of candidates are first configured and then specific information is indicated.

Additionally/alternatively, according to various embodiments, the above-described panel related identification information may be configured in units of a single panel and/or in units of multiple panels (e.g., panel group, panel set, etc.).

FIG. 18 is a diagram schematically illustrating a method of operating a UE and a network node according to various embodiments.

Figure 19:
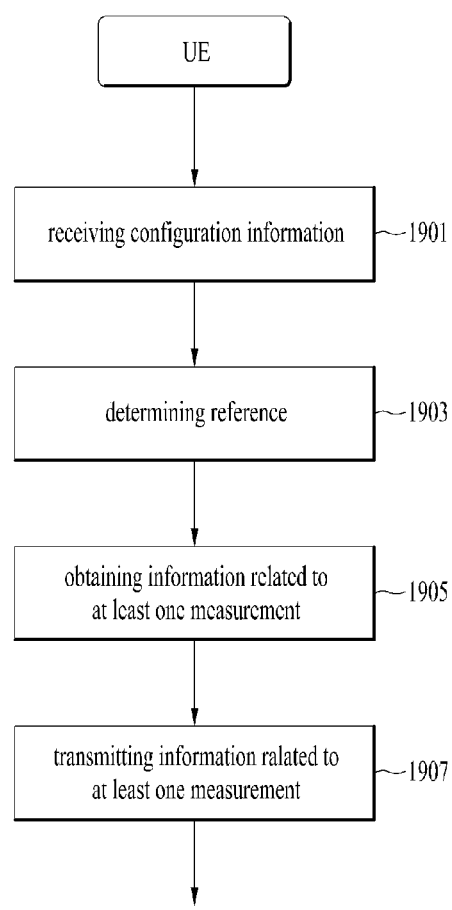
FIG. 19 is a flowchart illustrating a method of operating a UE according to various embodiments.

FIG. 19 is a flowchart illustrating a method of operating a UE according to various embodiments.

Figure 20:
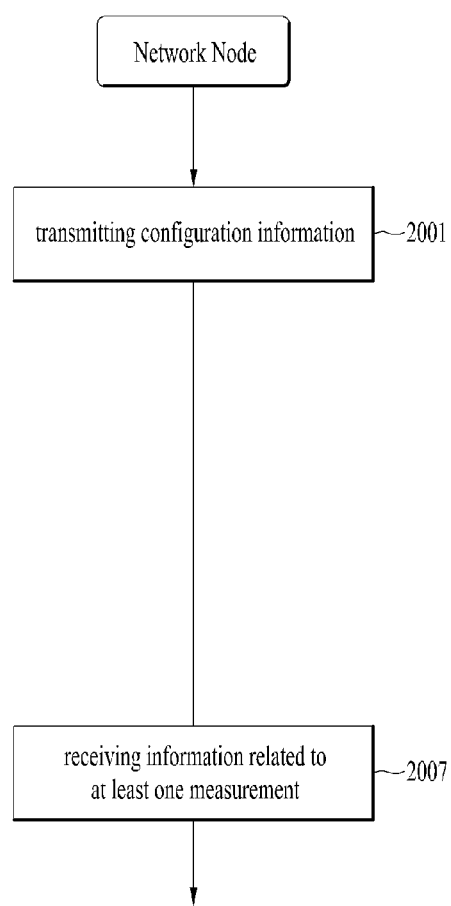
FIG. 20 is a flowchart illustrating a method of operating a network node according to various embodiments.

FIG. 20 is a flowchart illustrating a method of operating a network node according to various embodiments. For example, the network node may be a TP, a BS, a cell, a location server, an LMF, and/or any device performing the same operation.

Referring to FIGS. 18 to 20, in operations 1801, 1901, and 2001 according to various embodiments, the network node may transmit configuration information, and the UE may receive the configuration information.

According to various embodiments, the configuration information may be related to a reference configuration for measurement related to positioning.

In operations 1803 and 1903 according to various embodiments, the UE may determine/configure/obtain reference for positioning.

In operations 1805 and 1905 according to various embodiments, the UE may obtain information related to one or more measurements based on the reference.

In operations 1807, 1907, and 2007 according to various embodiments, the UE may transmit/report the information related to one or more measurements, and the network node may receive the information.

According to various embodiments, the configuration information may include information on a reference antenna group/a reference antenna set/a reference antenna element/a reference panel configured/implemented for the UE among one or more antenna groups/one or more antenna sets/one or more antenna elements/one or more panels. For example, this may relate to configuring at least one antenna group/antenna set/antenna element/panel among one or more antenna groups/one or more antenna sets/one or more antenna elements/one or more panels configured/implemented for the UE Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments

4.1. Exemplary Configurations of Devices to which Various Embodiments are Applied FIG. 21 is a diagram illustrating a device that implements various embodiments.

Figure 21:
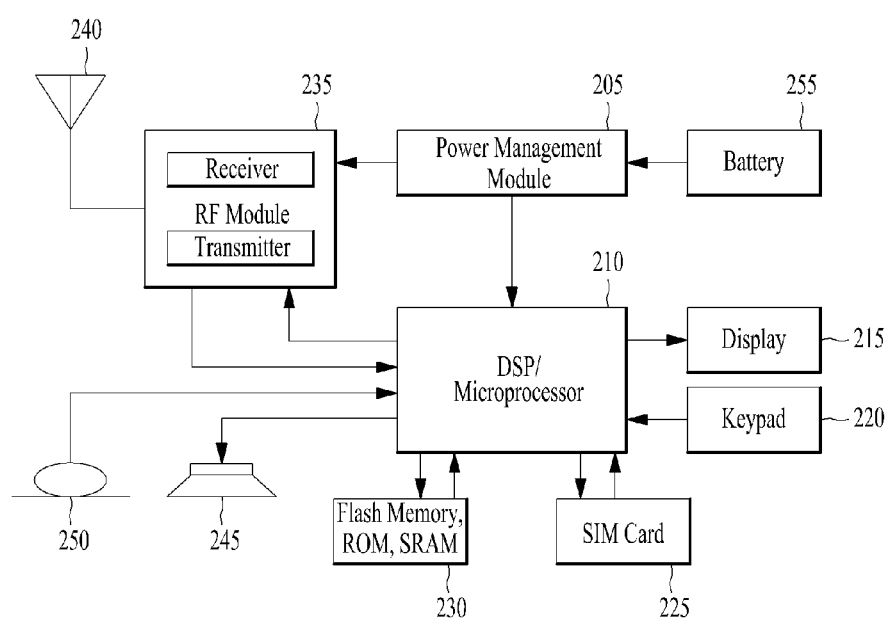
FIG. 21 is a block diagram illustrating an apparatus for implementing various embodiments of the present disclosure.

The device illustrated in FIG. 21 may be a UE and/or a BS (e.g., eNB or gNB or TP) and/or a location server (or LMF) which is adapted to perform the above-described mechanism, or any device performing the same operation.

Referring to FIG. 21, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 21 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, the at least one processor included in the UE (or the at least one processor of the communication device included in the UE) may receive configuration information related to a reference configuration for measurement related to positioning.

According to various embodiments, the at least one processor included in the UE may determine a reference for the measurement.

According to various embodiments, the at least one processor included in the UE may obtain information related to one or more measurements based on the reference According to various embodiments, the at least one processor included in the UE may report the information related to the one or more measurements.

According to various embodiments, the configuration information may include information related to a reference antenna group among one or more antenna groups configured for the UE.

According to various embodiments, at least one processor included in a network node (or at least one processor of a communication device included in the network node) may transmit configuration information related to a reference configuration for measurement related to positioning.

According to various embodiments, the at least one processor included in the network node may receive, from a UE, information related to one or more measurements based on a reference for the measurement. For example, the UE may be a UE that has received configuration information.

According to various embodiments, the configuration information may include information related to a reference antenna group among one or more antenna groups included in the UE.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
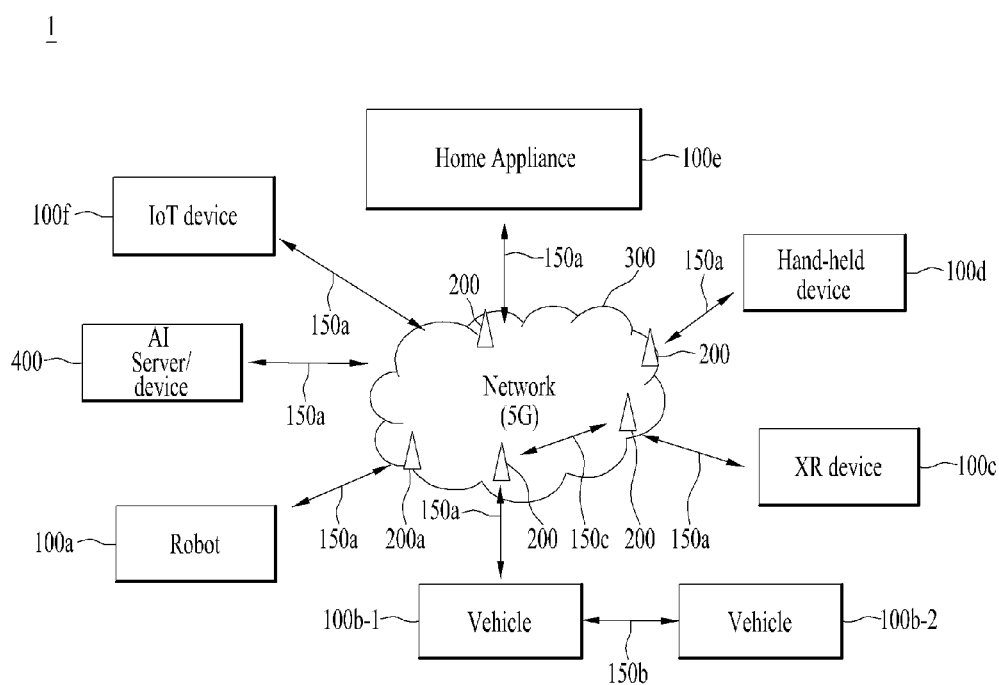
FIG. 22 illustrates an exemplary communication system to which various embodiments of the present disclosure are applied.

FIG. 22 illustrates an exemplary communication system to which various embodiments of the present disclosure are applied.

Referring to FIG. 22, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, integrated access backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 23:
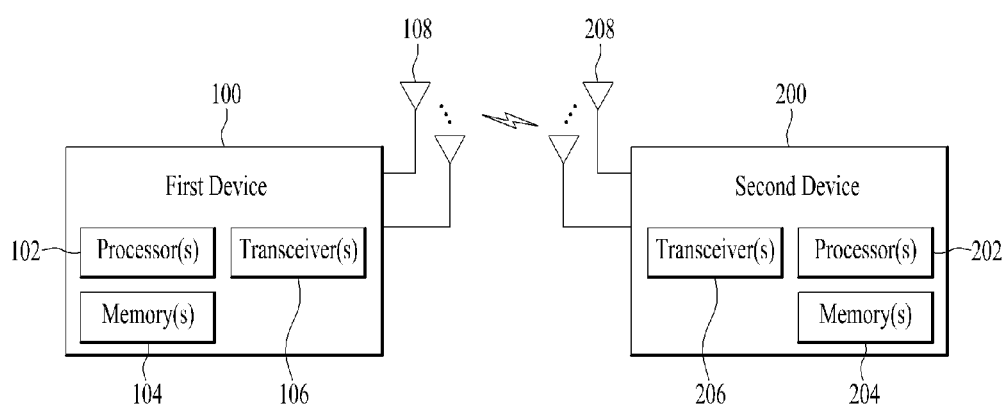
FIG. 23 illustrates exemplary wireless devices to which various embodiments of the present disclosure are applicable.

Example of Wireless Devices to which Various Embodiments of the Present Disclosure are Applied FIG. 23 illustrates exemplary wireless devices to which various embodiments of the present disclosure are applicable.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 22.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 24:
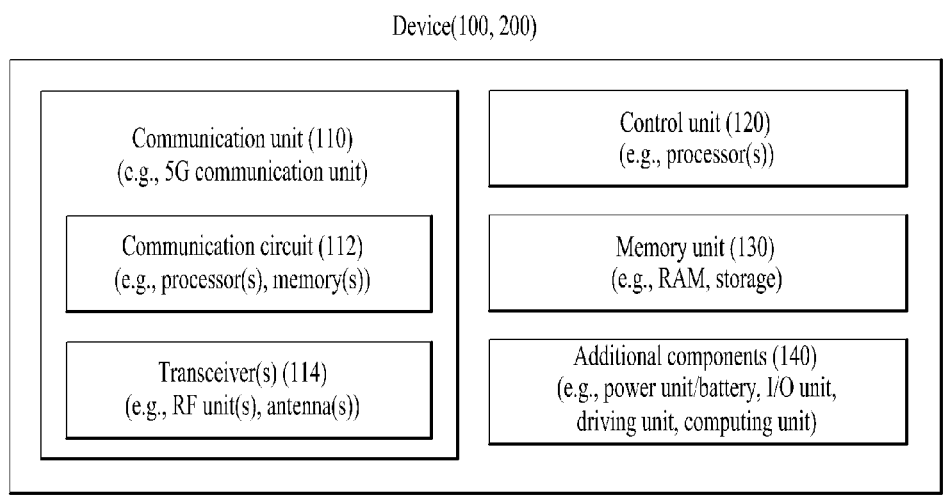
FIG. 24 illustrates other exemplary wireless devices to which various embodiments of the present disclosure are applied.

Example of Using Wireless Devices to which Various Embodiments of the Present Disclosure are Applied FIG. 24 illustrates other exemplary wireless devices to which various embodiments of the present disclosure are applied. The wireless devices may be implemented in various forms according to a use case/service (see FIG. 22).

Referring to FIG. 24, wireless devices 100 and 200 may correspond to the wireless devices 100 and 200 of FIG. 23 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 23. For example, the transceiver(s) 114 may include the one or more transceivers 106 and 206 and/or the one or more antennas 108 and 208 of FIG. 23. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 22), the vehicles (100b-1 and 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a Fintech device (or a finance device), a security device, a climate/environment device, the AI server/device (400 of FIG. 22), the BSs (200 of FIG. 22), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
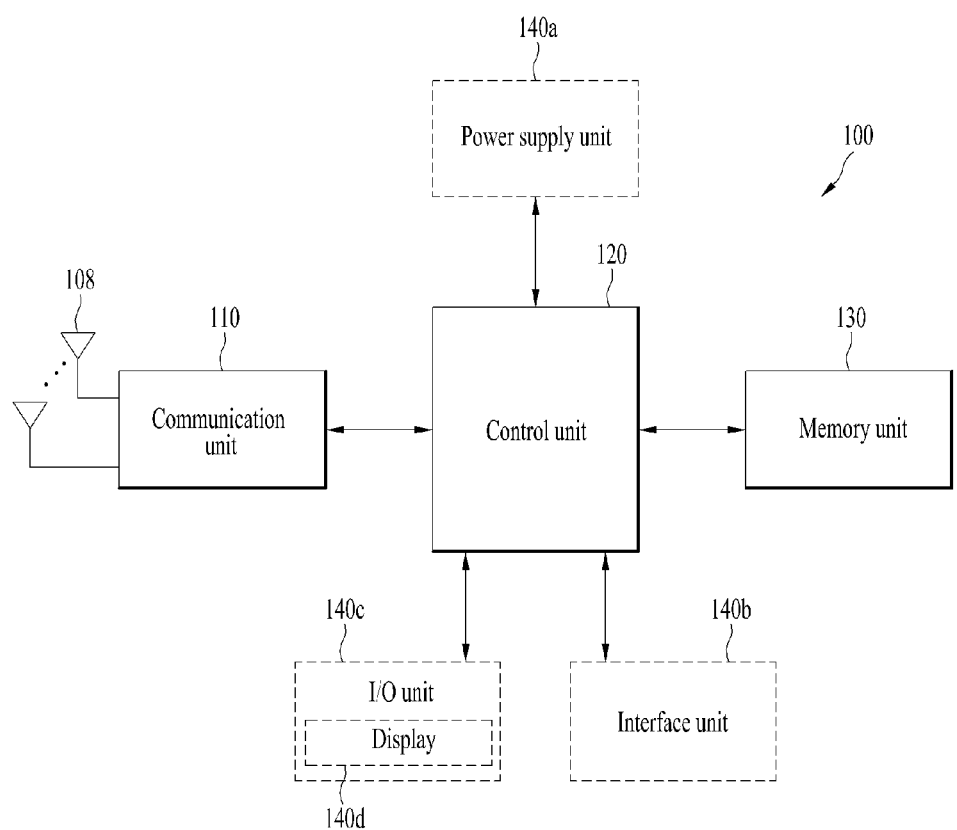
FIG. 25 illustrates an exemplary portable device to which various embodiments of the present disclosure are applied.

Example of Portable Device to which Various Embodiments of the Present Disclosure are Applied FIG. 25 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130.

The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 26:
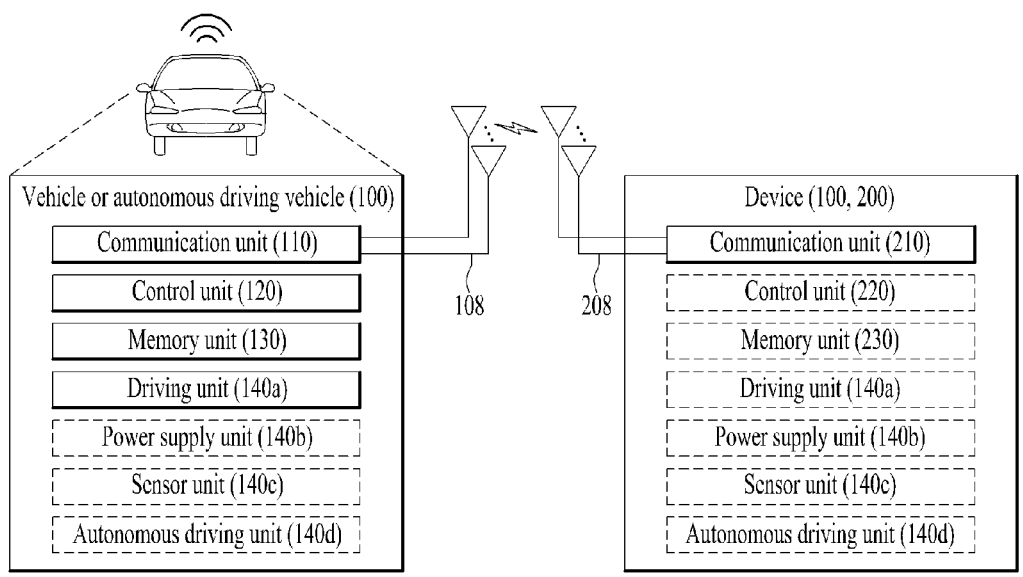
FIG. 26 illustrates an exemplary vehicle or autonomous driving vehicle to which various embodiments of the present disclosure.

Example of Vehicle or Autonomous Driving Vehicle to which Various Embodiments of the Present Disclosure FIG. 26 illustrates an exemplary vehicle or autonomous driving vehicle to which various embodiments of the present disclosure. The vehicle or autonomous driving vehicle may be implemented as a mobile robot, a car, a train, a manned/ unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
receiving, from a network, configuration information related to a reference configuration for measurement related to positioning;
determining a reference timing for the measurement;
performing one or more measurements related to positioning based on the reference timing; and
transmitting a report including information related to the one or more measurements,
wherein the configuration information includes information related to a reference reception (RX) antenna group of a plurality of RX antenna groups of the UE, and
wherein, based on a first RX antenna group being configured by the network as the reference RX antenna group, and the reference timing being determined based on a second RX antenna group other than the first RX antenna group: the report includes information for identifying the second RX antenna group.

2. The method of claim 1, wherein the configuration information further includes at least one of:
information related to a reference transmission point (TP);
information related to a reference positioning reference signal (PRS) resource;
information related to a reference PRS resource set;
information related to a reference synchronization signal/physical broadcast channel (SS/PBCH) block;
information related to a reference channel state information reference signal (CSI-RS) resource; or
information related to a reference CSI-RS resource set.

3. The method of claim 1, wherein the second RX antenna group is selected based on measurement qualities of positioning reference signals (PRSs) through the plurality of RX antenna groups.

4. The method of claim 1, wherein different identifiers (IDs) are respectively mapped to the plurality of RX antenna groups, and
wherein based on a number of the plurality of RX antenna groups being N, the information related to the reference antenna group includes an integer selected from $\{0, \ldots, N-1\}$ related to the different IDs, where N is a natural number.

5. The method of claim 1, wherein different uplink reference signal (UL RS) resource sets for UL RSs are respectively mapped to the plurality of RX antenna groups, and
wherein the information related to the reference antenna group includes information on an identifier (ID) selected from among IDs of the different UL RS resource sets.

6. The method of claim 1,
wherein the configuration information further includes information related to a reference reception beam among one or more reception beams available to the UE,
wherein the reference reception beam is related to a transmission beam for an uplink reference signal (UL RS),
wherein the information related to the reference reception beam includes at least one of information related to a UL RS resource for the UL RS or information related to a UL RS resource set.

7. A user equipment (UE) in a wireless communication system, the UE comprising:
a transceiver;
a memory; and
one or more processors connected to the transceiver and the memory,
wherein the one or more processors are configured to:
receive, from a network, configuration information related to a reference configuration for measurement related to positioning;
determine a reference timing for the measurement;
perform one or more measurements related to positioning based on the reference timing; and transmit a report including information related to the one or more measurements, and wherein the configuration information includes information related to a reference reception (RX) antenna group of a plurality of RX antenna groups of the UE, and wherein, based on a first RX antenna group being configured by the network as the reference RX antenna group, and the reference timing being determined based on a second RX antenna group other than the first RX antenna group: the report includes information for identifying the second RX antenna group.

8. The UE of claim 7, wherein the UE is configured to communicate with at least one of a mobile terminal, a network, or an autonomous driving vehicle.

9. A method performed by an apparatus in a wireless communication system, the method comprising:

transmitting configuration information related to a reference configuration for measurement related to positioning; and receiving, from a user equipment (UE), a report including information related to one or more measurements related to positioning performed based on a reference timing, wherein the configuration information includes information related to a reference reception (RX) antenna group of a plurality of RX antenna groups of the UE, wherein, based on a first RX antenna group being configured by the apparatus as the reference RX antenna group, and the reference timing being determined based on a second RX antenna group other than the first RX antenna group: the report includes information for identifying the second RX antenna group.

10. An apparatus in a wireless communication system, the apparatus comprising:

a transceiver:

a memory; and one or more processors connected to the transceiver and the memory, wherein the one or more processors are configured to:

transmit configuration information related to a reference configuration for measurement related to positioning; and receive, from a user equipment (UE), a report including information related to one or more measurements related to positioning performed based on a reference timing, wherein the configuration information includes information related to a reference reception (RX) antenna group of a plurality of RX antenna groups of the UE, wherein, based on a first RX antenna group being configured by the apparatus as the reference RX antenna group, and the reference timing being determined based on a second RX antenna group other than the first RX antenna group: the report includes information for identifying the second RX antenna group.

* * * * *